(12) United States Patent
Wang et al.

(10) Patent No.: US 9,026,039 B2
(45) Date of Patent: *May 5, 2015

(54) METHOD AND SYSTEM FOR A WIRELESS MULTI-HOP RELAY NETWORK

(71) Applicant: Apple, Inc., Cupertino, CA (US)

(72) Inventors: Guo Qiang Wang, Kanata (CA); Wen Tong, Ottawa (CA); Shiquan Wu, Nepean (CA)

(73) Assignee: Apple Inc., Cupertino, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/757,416

(22) Filed: Feb. 1, 2013

(65) Prior Publication Data

US 2013/0142109 A1    Jun. 6, 2013

Related U.S. Application Data

(63) Continuation of application No. 13/159,914, filed on Jun. 14, 2011, now Pat. No. 8,391,778, which is a continuation of application No. 11/678,142, filed on Feb. 23, 2007, now Pat. No. 7,986,915.

(60) Provisional application No. 60/776,448, filed on Feb. 24, 2006.

(51) Int. Cl.
*H04B 3/36* (2006.01)
*H04B 7/14* (2006.01)
(Continued)

(52) U.S. Cl.
CPC ............... *H04W 40/22* (2013.01); *H04B 7/155* (2013.01); *H04B 7/2606* (2013.01); *H04L 45/54* (2013.01); *H04L 45/586* (2013.01); *H04W 40/12* (2013.01); *H04W 40/24* (2013.01)

(58) Field of Classification Search
USPC ............................................................ 455/7
See application file for complete search history.

(56) References Cited

U.S. PATENT DOCUMENTS

2002/0187746 A1* 12/2002 Cheng et al. ................. 455/11.1
2003/0091014 A1    5/2003 Meier
(Continued)

FOREIGN PATENT DOCUMENTS

| EP | 1480387 | 11/2004 |
|---|---|---|
| WO | 2005025110 | 3/2005 |

OTHER PUBLICATIONS

Pabst et al.; "Relay-Based Deployment Concepts for Wireless and Mobile Broadband Radio;" Wireless World Research Forum, IEEE Communications Magazine, Sep. 2004, pp. 80-89.
(Continued)

*Primary Examiner* — Ankur Jain
(74) *Attorney, Agent, or Firm* — Meyertons, Hood, Kivlin, Kowert & Goetzel, P.C.

(57) ABSTRACT

In a wireless multi-hop relay network arranged in a tree topology, the base station and one or more relay stations are associated as a virtual base station (VBS). The base station and each relay station have a unique virtual base station identifier (VBS-ID) associated with the path defined by the base station and the one or more relay stations. a relay station in the branch uses its VBS-ID for communicating with an attached subscriber station (e.g. a mobile station) such that communications between the base station and subscriber station occur via the VBS. Subscriber station data communications are relayed between the base station and the one or more relay stations over the VBS via a tunnel connection. The VBS is autoconfigurable. Mobility for subscriber stations and relay stations is provided through reconfiguration of VBS's.

10 Claims, 25 Drawing Sheets

(51) Int. Cl.
*H04W 40/22* (2009.01)
*H04B 7/155* (2006.01)
*H04B 7/26* (2006.01)
*H04L 12/741* (2013.01)
*H04L 12/713* (2013.01)
*H04W 40/24* (2009.01)
*H04W 40/12* (2009.01)

(56) References Cited

U.S. PATENT DOCUMENTS

| | | | |
|---|---|---|---|
| 2003/0124976 | A1 | 7/2003 | Tamaki et al. |
| 2003/0125067 | A1 | 7/2003 | Takeda et al. |
| 2005/0014464 | A1 | 1/2005 | Larsson |
| 2005/0018679 | A1 | 1/2005 | Iwami |
| 2005/0068933 | A1 | 3/2005 | Kokkonen et al. |
| 2005/0078659 | A1 | 4/2005 | Ashwood Smith |
| 2005/0113117 | A1* | 5/2005 | Bolin et al. ............... 455/456.6 |
| 2005/0265329 | A1 | 12/2005 | Havala et al. |
| 2006/0046643 | A1* | 3/2006 | Izumikawa et al. ............. 455/7 |
| 2006/0130126 | A1 | 6/2006 | Touve et al. |
| 2006/0160536 | A1 | 7/2006 | Chou |
| 2007/0097945 | A1* | 5/2007 | Wang et al. ................. 370/349 |

OTHER PUBLICATIONS

Kamlesh et al.; "Scalable Connection Oriented Mesh Proposal;" IEEE 802.16 Broadband Wireless Access Working Group, Mar. 6, 2003, http://www.ieee802.org/16/tgd/contrib/C80216d-03_18.pdf, 21 pages.

Examination Report for European Patent Application No. 067760363, issued Dec. 27, 2011, 5 pages.
Examination Report for European Patent Application No. 067760363, issued Apr. 1, 2011, 7 pages.
Extended European Search Report for European Patent Application No. 06776063, mailed Apr. 1, 2011, 7 pages.
International Search Report for International Application No. PCT/CA2006/001280, mailed Nov. 22, 2006, 3 pages.
IEEE Standard for Local and Metropolitan Area Networks Part 16: Air Interface for fixed Broadband Wireless Access Sytems; IEEE Std 802.16-2004 (Revision of IEEE Std 802.16-2001) Jan. 1, 2004, p. 1-857, IEEE Standard, IEEE, Piscataway, NJ.
Johnson et al. "The Dynamic Source Routing Protocol for Mobile Ad Hoc Network (DSR)", Jul. 19, 2004, IETF Manet Working Group Internet-Draft, pp. 1-108, http:/fwww.ietf.org/internert-drafts/draft-letf-manet-dsr-10.txt.
Jamoussi et al.; "Constraint-Base LSP Set up using LDP;" Jan. 2002, Network Working Group, pp. 1-38, retrieved from <http://www.ieft.org/frc3212.txt>.
United States Patent and Trademark Office, "Communication" for related U.S. Appl. No. 11/478,719, mailed Dec. 8, 2009.
United States Patent and Trademark Office, "Communication" for related U.S. Appl. No. 11/478,719, mailed May 15, 2009.
United States Patent and Trademark Office, "Communication" for related U.S. Appl. No. 11/478,719, mailed Feb. 18, 2012.
United States Patent and Trademark Office, "Communication" for U.S. Appl. No. 13/159,861, mailed Dec. 27, 2011.
United States Patent and Trademark Office, "Communication" for U.S. Appl. No. 13/159,861, mailed May 9, 2012.

* cited by examiner

Routing Table in BS

| | VBS-ID | Path list | Next hop (intra cell) | Next hop (inter cell) | Ingress port | Egress port | RS or MS attached to this path as end point | Tunnel CID |
|---|---|---|---|---|---|---|---|---|
| | 160b | 160c | 160d | 160e | 160f | 160g | 160h | 160i |
| 160a | VBS0 | BS->RS1->RS2 | RS1 | | | Antenna #1 | RS5 | |
| | VBS1 | BS->RS1->RS2->RS5->RS7 | RS1 | RS5 | | Antenna #1 | MS1 | T-CID1 |

Fig. 4

Routing Table in RS5

| | VBS-ID | Path list | Next hop (intra cell) | Next hop (inter cell) | Ingress port | Egress port | RS or MS attached to this path as end point | Tunnel CID |
|---|---|---|---|---|---|---|---|---|
| | 162b | 162c | 162d | 162e | 162f | 162g | 162h | 162i |
| 162a | VBS1 | BS->RS1->RS2->RS5-RS6->RS7 | RS6 | MS1 | Antenna #4 (from RS2) | Antenna #5 (to RS6) | MS1 | T-CID1 |

Fig. 5

420  VBS ID TLV

| Syntax | Size | Notes |
|---|---|---|
| VBS_ID | 24 bits | VBS identifier which uniquely identifies a VBS |

430  Explicit route TLV

| Syntax | Size | Notes |
|---|---|---|
| N_entry | 16 bits | The number of entries in the list |
| For(j=0;j<N-entry;j++) { | | |
| Node_basic_CID | 16 bits | Node_basic_CID assigned to each RS |
| } | | |

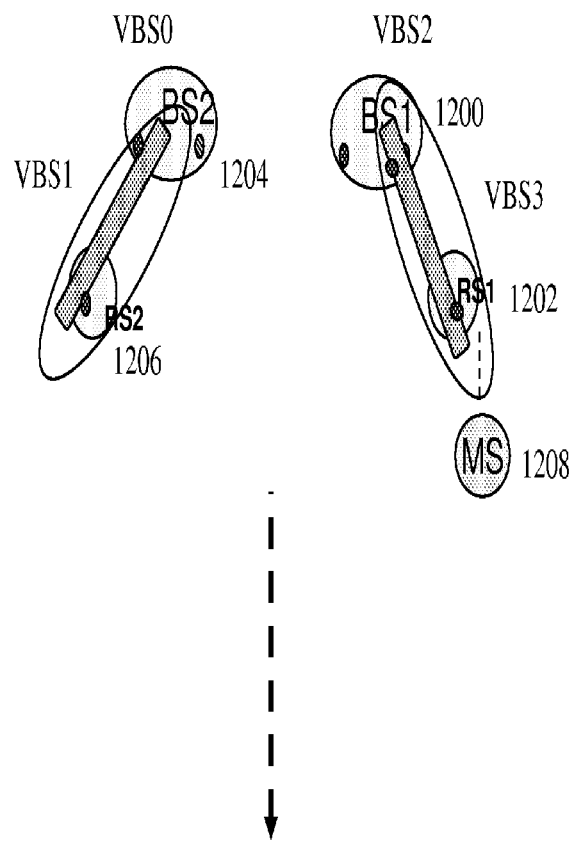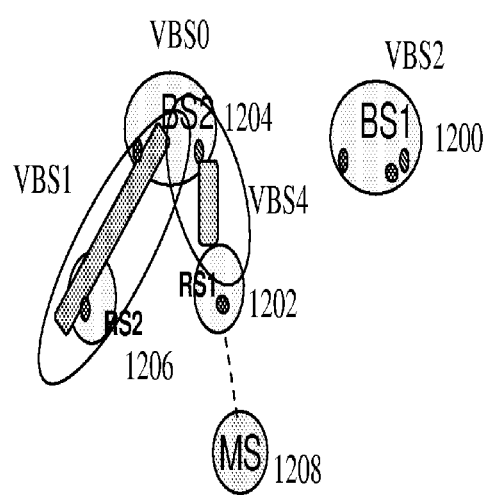
Fig. 25

METHOD AND SYSTEM FOR A WIRELESS MULTI-HOP RELAY NETWORK

PRIORITY CLAIM

This application is a continuation of U.S. patent application Ser. No. 13/159,914 entitled "METHOD AND SYSTEM FOR A WIRELESS MULTI-HOP RELAY NETWORK" to Wang et al. filed Jun. 14, 2011, which is a continuation of U.S. patent application Ser. No. 11/678,142, filed on Feb. 23, 2007, now U.S. Pat. No. 7,986,915, which claims the benefit of U.S. Provisional Patent Application No. 60/776,448, filed on Feb. 24, 2006, the entirety of which applications are incorporated by reference herein.

RELATED APPLICATIONS

This application is related to commonly owned and co-pending U.S. patent application Ser. No. 11/478,719, filed on Jul. 3, 2006, titled "METHOD AND SYSTEM FOR A WIRELESS MULTI-HOP RELAY NETWORK", which is hereby incorporated by reference in its entirety.

FIELD OF THE INVENTION

The invention relates to wireless networking protocols and systems.

BACKGROUND

WiMAX, described in the IEEE 802.16 Wireless Metropolitan Area Network (MAN) standard (IEEE 802.16-2005), allows for high-speed wireless data transmissions over long distances. The core components of an 802.16 network are base stations (BS) and subscriber stations (SS). An SS may be a mobile station (MS). The WiMAX network was originally designed as a Point-to-Multipoint (PMP) architecture. The 802.16-2005 standard defines a connection-oriented mechanism for data flow between BS and MS. A Connection ID (CID) is defined to associate a data flow service with a connection. CIDs are also used by MS's in PMP networks to tell which data bursts in a DL frame should be decoded and which should not.

WiMAX is now progressing to large scales and full mobility. In order to extend access coverage, optimize utilization of radio resources, and support flexible mobility, WiMAX is migrating from the one-hop PMP architecture to a multi-tier PMP topology, referred to as MMR (Mobile Multi-hop Relay). MMR is a tree-like relay architecture wherein a BS and SS may be separated by one or more relay stations (RS).

The MMR architecture presents new complications. MMR is different from legacy one-hop PMP access, where radio resources are allocated by centralized control in the Base Station (BS). The multi-tier MMR may require a distributed radio source allocation schema across BS and RS, or a hybrid schema of both centralized and distributed control. This distributed or hybrid schema should provide a relay operation to forward the data frame Down Link (DL) and Up Link (UL) between a BS and MS's via the RS's. Further, mobility functionality must be provided for MS's and RS's, both inter-tree and intra-tree.

Use of CIDs in MMR networks becomes a critical issue. Current suggested relay solutions require all RS to acquire, store, and decode the MAC PDUs in DL frames to get the CIDs of the MS for relay operation. As a result, RS MAC PDU decoding consumes excessive resources and RS forwarding tables become very large and ultimately unmanageable. Furthermore, to execute a handover of an MS from one branch to another branch of the MMR network, all the MS CIDs have to be transferred from all RS along the old branch to all RS along the new branch, resulting in very inefficient MMR relay operation. New relay and mobility solutions are required for 802.16 MMR networks in order to provide commercially reasonable efficiency and performance.

SUMMARY

The invention provides several solutions for the current issues in the MMR multi-hop architecture. Radio resource access is accompanied with topology information and shared/dedicated radio resource allocation policy. The overall end-to-end relay control is done in a collaborate manner among BS and RS. To accommodate large scale network size, efficient radio usage, and effective mobility management, the MMR network is logically partitioned into virtual groups. Based on the radio access policy, various methods are used to define the virtual groups such as vertical partitioning within a single routing domain (i.e., centralized), or horizontal partitioning within multiple routing domains (distributed), or hybrid of both.

Aspects of the invention apply to these virtual groups, including auto configuration of the groups, use of the groups for data relay over the relay stations in the MMR, and mobility of relay stations and subscriber stations within the MMR.

Accordingly, in a wireless multi-hop relay network arranged in a tree topology, the invention broadly applies to one or more relay stations coupled to a base station along a single tree branch. The base station and one or more relay stations are associated as a first virtual base station (VBS). The base station and each relay station have a unique virtual base station identifier (VBS-ID) associated with the path defined by the base station and the one or more relay stations. The last relay station in the branch uses its VBS-ID for communicating with an attached subscriber station (e.g. a mobile station) such that communications between the base station and subscriber station occur via the first VBS.

According to a further aspect, the first VBS is further associated with a tunnel connection identifier (T-CID). The base station uses the T-CID to relay subscriber station data communications between the base station and the one or more relay stations.

In one implementation, the base station and relay stations each include a routing table. Each routing table includes one or more entries including a VBS-ID, a path list associated with the VBS-ID, and a T-CID associated with the VBS.

Each RS in the VBS can use the routing table in support of data relay across the MMR. Accordingly, an RS performs the following functions in response to receipt of a message from an upstream station in the VBS. The RS searches the relay station routing table for the received T-CID. If the received T-CID is not in the routing table, the RS drops the message. If the received T-CID is in the routing table, and the T-CID is associated with a VBS-ID that is associated with another relay station, then the RS forwards the message to the another relay station. If the received T-CID is in the routing table and the T-CID is associated with a subscriber station, then the RS removes the T-CID and forwards the message to the subscriber station via a connection identifier associated with the subscriber station.

When the multi-hop relay network is an 802.16 network, a relay station in a VBS performs the following functions as part of VBS auto discovery in accordance with the invention. The RS receives a DL-MAP message from the base station.

If the relay station is not attached to an upstream station then the RS sends a range request message to the upstream station. The RS will then receive a range response message from the upstream station containing a unique VBS-ID for the relay station. The RS then exchanges DSx messages with the upstream station to obtain a T-CID. The RS then updates the routing table with an entry including the VBS-ID and T-CID.

If the relay station is attached to an upstream station, then the RS replaces the station identifier in the DL-MAP message with the VBS-ID for the relay station, and forwards the DL-MAP message downstream.

The RS may further perform the following functions in furtherance of auto discovery. The RS can receive a range request message from a downstream relay station. The RS would then receive a range response message from an upstream station containing a unique VBS-ID for the downstream relay station. The RS would next receive a DSx messages from the upstream station containing a T-CID for the downstream station. The RS forwards the DSx message to the downstream station, and updates its routing table with the VBS-ID and T-CID for the downstream station.

In accordance with another aspect of the invention, VBS's are used in furtherance of intra-tree handover in an MMR. The handover occurs between the first VBS and a second VBS.

Accordingly, the second VBS includes one or more relay stations coupled to the base station along a second tree branch. The base station and one or more relay stations along the second tree branch associated as a second VBS. The base station and each relay station associated with the second VBS having a unique VBS-ID. A handover procedure transfers subscriber station communications from the first VBS to the second VBS. A relay station in the second VBS uses its VBS-ID for communicating with the transferred subscriber stations via the second VBS, so that communications between the base station and subscriber station occur via the second VBS instead of the first VBS.

According to an implementation of the handover, a base station sends an advertisement message including a list of available VBS including the second VBS. The base station then receives a handover indication message from a subscriber station indicating that subscriber station communications are transferring to the second VBS. The base station then updates its routing table to indicate a VBS-ID and T-CID for the second VBS to be used for communicating with the subscriber station. Each relay station in the second VBS updates its routing tables to indicate the VBS-ID and associated T-CID to be used for communicating with the subscriber station.

In accordance with another aspect of the invention, VBS's are used in furtherance of inter-tree handover in an MMR network. The handover occurs between the first VBS and a second VBS, wherein each VBS is headed by a separate BS.

In this case, a second base station is coupled to one or more relay stations along a single tree branch subordinate to the second base station, the second base station and one or more relay stations associated as a second VBS. A handover procedure is performed to transfer subscriber station communications from the first VBS to the second VBS. A relay station in the second branch uses its VBS-ID for communicating with the transferred subscriber station via the second VBS so that communications between the base station and subscriber station occur via the second VBS instead of the first VBS.

According to an implementation, in order to perform inter-tree handover, the first and second base stations exchanging their routing tables so that VBS's in each base station can be advertised by the other. The remaining procedure for handover is substantially similar to that described for the intra-tree case.

The invention further provides "virtual access points" (VAPs). VAPs are groups of network elements arranged in a tree topology, for example a head BS and multiple VAP RS's, or a head RS and multiple other VAP RS's. All the network elements in a VAP share the same radio resource. A VAP can provide multiple radio links via its VAP RS's. A subscriber station or relay station attached to the VAP can communicate with a VAP over any one of the radio links in a manner transparent to the subscriber or relay station.

In accordance with the invention, VAPs can form VBS's. For instance, a first and second VAP can be associated as a first virtual base station, wherein the first and second VAPs each have a unique virtual base station identifier (VBS-ID). A relay station in the second VAP uses the VBS-ID of the second VAP for communicating with a subscriber station attached to the second VAP so that communications between the BS and subscriber station occur via the first VBS.

In further accordance with the invention, the base station and all VAP relay stations in the first VAP share the same radio resource, so that the first VAP provides multiple radio links via its VAP relay stations. The relay station in the second VAP is capable of communicating with the first VAP over any one of the radio links in a manner transparent to the relay station. Thus, communications over the first VBS can occur transparently via one of multiple radio links between the VAPs.

Furthermore, the second VAP can provide multiple second radio links via the VAP relay stations in the second VAP. The subscriber station can then communicate with the second VAP over any one of the second radio links in a manner transparent to the subscriber station.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which:

FIG. 4 is a routing table for the base station (BS) in the network of FIG. 3;

FIG. 5 is a routing table for the relay station (RS) RS5 in the network of FIG. 3;

FIG. 10 is a representation of a TLV extension for an 802.16 REG-RSP message;

FIG. 11 is a representation of a TLV extension for an 802.16 DSA-REQ message;

FIG. 25 is a schematic diagram of two MMR trees wherein an RS moves from an RS of one MMR tree to a BS of another MMR tree;

DETAILED DESCRIPTION

A wireless multi-hop relay access network is described herein. In a multi-hop relay access network, relay stations (RS) are introduced for fixed, nomadic and mobile relay usage between base stations (BS) and subscriber stations (SS). The functional scope of a relay station can scale from being very simple such as an analog signal repeater, to a base station compliant fully functional device capable of radio resource scheduling, security authentication and connection management for mobile stations, in case a base station fails.

Figure 1:
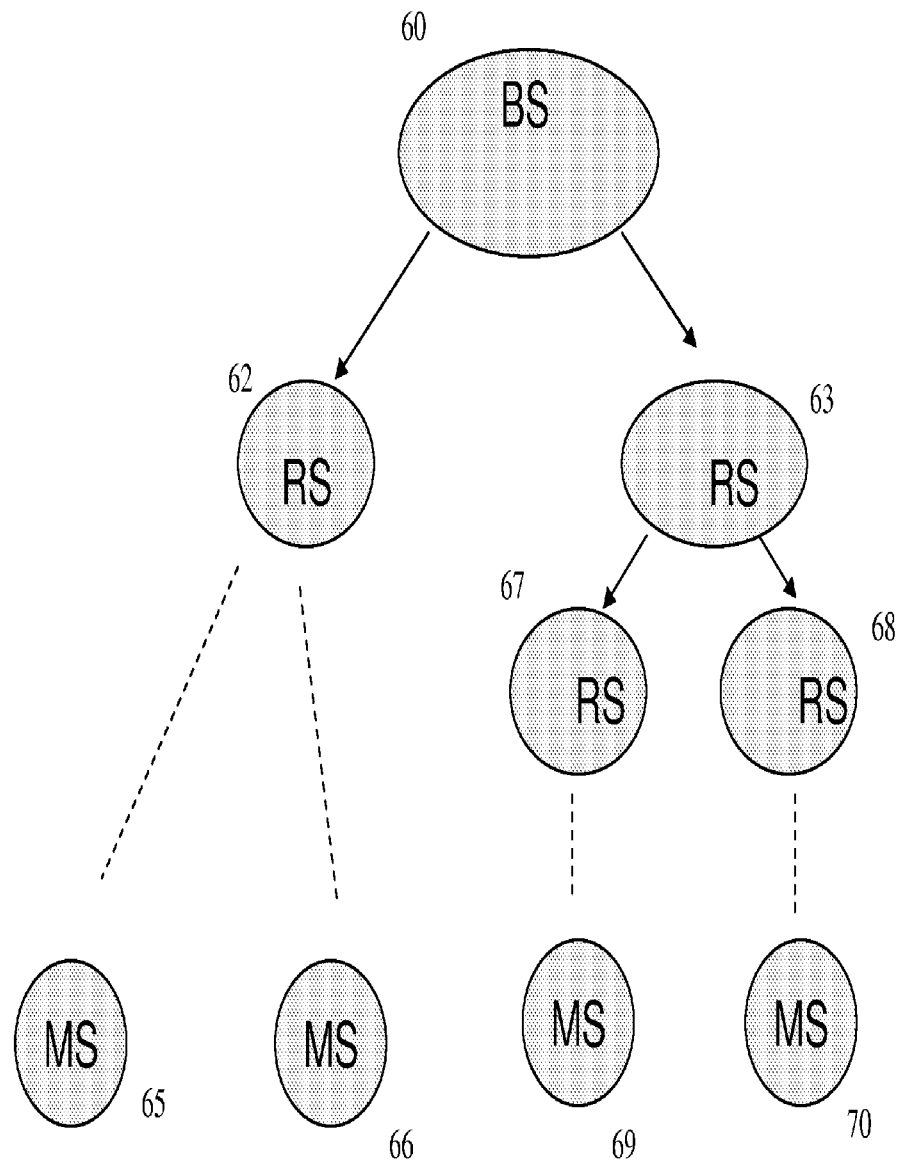
FIG. 1 is a schematic diagram of a prior art multi-hop relay network.

FIG. 1 is a schematic diagram of a very simple two-tier PMP relay network. In this example, the SS are mobile stations (MS). MS is used for the remainder of this description, as the invention provides advantages when used with mobile stations, though it is understood that mobile stations are a subset of subscriber stations to which the invention broadly applies. At the tree trunk level, BS 60 communicates with RS 62 and RS 63. RS 62 in turn communicates with MS 65 and MS 66. Similarly, RS 63 communicates with RS 67 and RS 68. RS 67 communicates with MS 69, and RS 68 communicates with MS 70.

Figure 2:
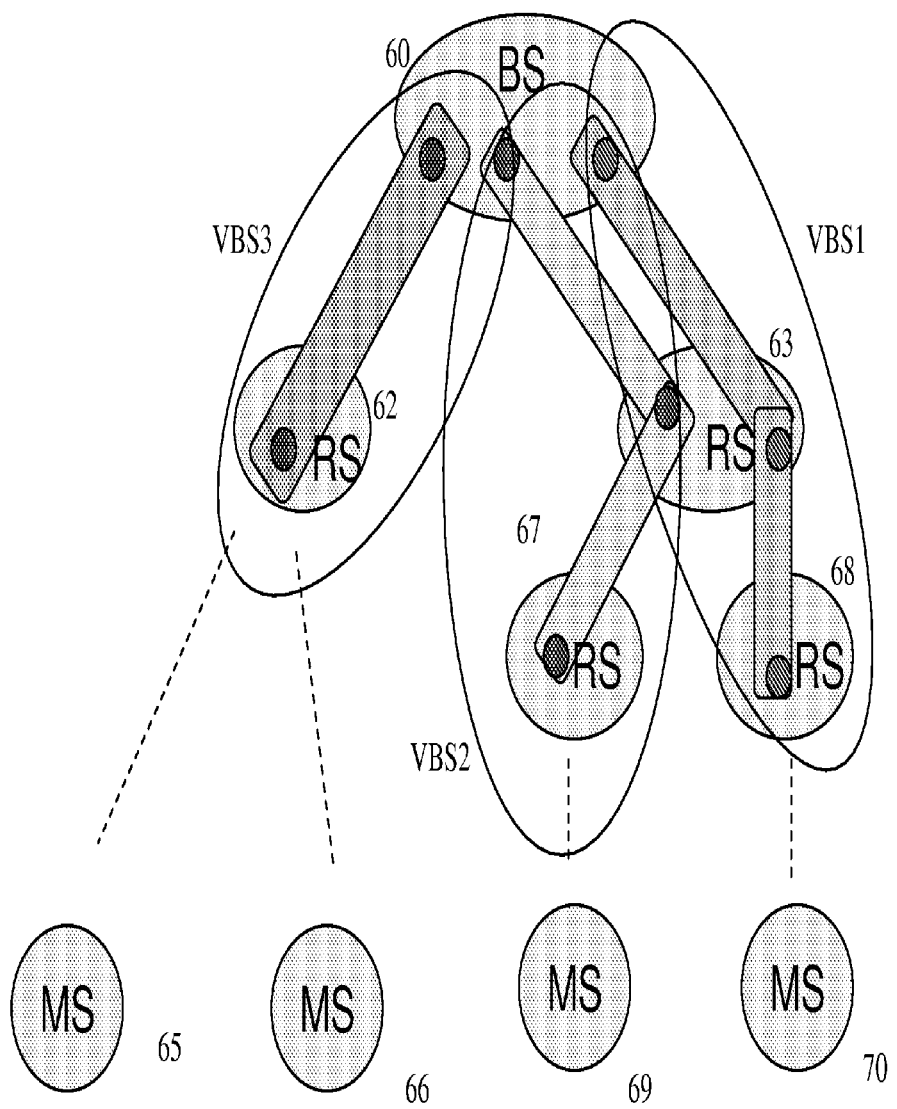
FIG. 2 is a schematic diagram of a multi-hop relay network employing virtual base stations (VBS) in accordance with the invention.

Through the use of a PMP multi-hop relay protocol, a payload can, for example, be delivered from BS 60 to SS 69 through RS 63 and RS 67. FIG. 2 is only one example of a PMP multi-hop relay network that can be used with the present invention. It is to be understood that the number of RS's and MS's in the network can vary from that shown in FIG. 2. The example of FIG. 2 is a tree topology, and this is assumed for the details that follow. In an 802.16 network, this PMP multi-hop relay network is referred to as MMR (Multiple Multi-hop Relay). The various aspects of the invention will be described as applied to an 802.16 MMR network. The messaging protocols of 802.16 will be referred to herein and are fully described in "IEEE Std 802.16e 2005", which is an extension of "IEEE Std 802.16 2004", all available from the IEEE Standards Association, and herein incorporated by reference.

In an 802.16 MMR network like that of FIG. 1 several functional aspects must be addressed. There must be provided a means for relaying data between BS and MS via the RS's. There must also be provided a means for maintaining data connections between the BS and MS when the MS or any RS's on the path between it and the BS move. In accordance with the invention, the concept of a virtual base station (VBS) is introduced to provide these and other functions in an efficient and high performance manner. Referring to FIG. 2, there is shown the MMR network of FIG. 1 wherein VBS are employed. A VBS is an MMR logical partition of the BS and RS's along an MMR path running between a BS and MS or RS. Several VBS are shown in FIG. 2. VBS1 consists of a partition of the BS 60, RS 63, and RS 68. From the perspective of the MS 70, VBS 1 is functionally equivalent to a BS to which it is directly connected. But data is actually relayed between the BS 60 and MS 70 via the RS 63 and 68. VBS2 is shown consisting of a partition of the BS 60, RS 63, and RS 67. The MS 69 communicates with VBS2 as if it is a directly attached BS. VBS3 is shown consisting of a partition of the BS 60 and RS 62. The MS 65 and 66 communicate with VBS3 as if it is a directly attached BS.

Various aspects of the invention are now described in detail, as follows:
  Virtual Access Point
  Autodiscovery and Data Relay over VBS
  Mobility
  Inter-tree and intra-tree MS mobility
  Inter-tree and intra-tree RS mobility
  Virtual Access Point In accordance with an aspect of the invention, a "virtual access point" (VAP) is defined. A VAP, also referred to as a "cell", is a group of network elements such as BS and RS, or all RS. The network elements in each cell are arranged in a tree topology. A single VAP appears to external network elements as a single BS which may have one or more radio links for attachment.

Figure 3:
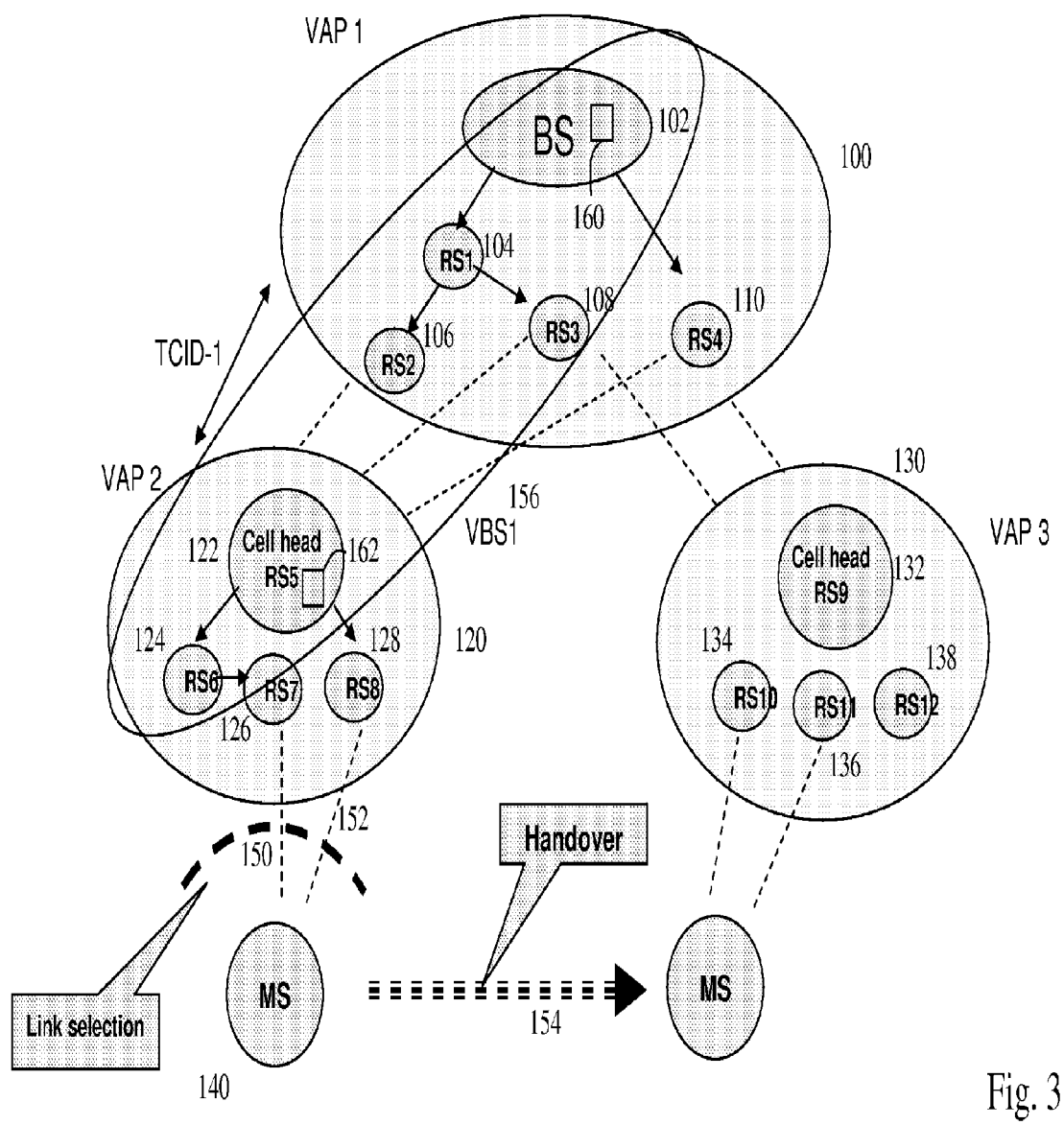
FIG. 3 is a schematic diagram of a multi-hop relay network employing virtual access points and VBS in accordance with the invention, using a global tunnel connection identifier (T-CID)

Referring to FIG. 3, a topological view of a network implementing VAPs is shown. Each VAP consists of one cell head (BS or RS) and all of its subordinate RS. As shown, VAP 1 (100) includes cell head BS (102) and RS1 (104), RS2 (106), RS3 (108), and RS4 (110). VAP 2 (120) includes cell head RS5 (122), RS6 (124), RS7 (126), and RS8 (128). VAP 3 (130) includes cell head RS9 (132), RS10 (134), RS11 (136), and RS12 (138). An MS 140 is shown attached to the VAP 2. Within each VAP, all the nodes share the same network resources including geographical topology information, radio resource information such as preamble, channel and associated control/data information (e.g., 802.16 DL-MAP_IE, data packet flow SFIDs). So, from any MS's perspective, the VAP to which it is attached is no different than a BS as previously defined for an 802.16 network.

In FIG. 3, the MS 140 is shown to have multiple access links 150, 152 to the VAP 2. All these links have the same attributes (preamble, channel, DL-MAP_IE, etc.,). So the mobility for an MS within a VAP is the same as the 802.16 defined process by which an access link is chosen by the BS based on link quality (see 802.16 standard.) The MS can be switched between these access links in a manner that is transparent to the MS. In further accordance with the invention, the 802.16 handover process only happens between VAPs, in the same manner in which an MS roams between the serving BS and the target BS in a traditional 802.16 PMP network. Thus, the 802.16 handover process would be invoked if MS 140 moves to VAP 3 (shown as arrow 154).

The VAPs of FIG. 3 cooperate to provide a VBS for communication with the MS 140 as will be further described. An implementation of a VBS (156) is shown in FIG. 3 as a partition of VAP 1 concatenated with a partition of VAP2. In order to support the VBS functionality, the cell head for each VAP has associated with it a VBS routing table. The BS has a VBS routing table 160. The RS5 has a VBS routing table 162. Examples of VBS routing tables are shown in FIGS. 4 and 5. The table 160 has entries 160*a* for VBS paths through the VAPs. Column 160*b* stores a VBS Identifier (VBS-ID). Column 160*c* stores a path list with which the VBS-ID is associated. Column 160*d* is the intra-cell next hop for the path list. Column 160*e* is the inter-cell next hop for the path list. Columns 160*f* and 160*g* are ingress ports and egress ports respectively for this path. Column 160*h* is the endpoint (RS or MS) of the path. Column 160*i* is a T-CID related to the path for the entry. The table 162 has similar entries and columns labelled 162*a-i*.

In FIG. 3, the BS 102 of VAP 1 may have a 3 sector antenna. One Once sector is directed to RS1, and the second one to RS4. Each antenna is an identified air interface. The routing paths in the VAP 1 are thus BS→RS1→RS2, BS→RS1→RS3, and BS→RS4. The BS 102 can send the same data burst to RS2, RS3 and RS4. The internal relay RS1 has its own routing table to forward the data to RS2 and RS3.

RS5 also has a 3 sector antenna in this example. One, antenna #4, is the ingress sector to RS5 from VBS1. Another, antenna #5, is directed to RS6, while the other, antenna #6, is directed to RS8. The potential routing paths from the BS 102 to the MS 140 are: BS→RS1→R52→R55→R57, BS→RS1→R53→R55→R57, BS→R54→R55→R57, BS→RS1→R52→R55→R58, BS→RS1→R53→ R55→R58, BS→R54→R55→R58, which are the combination of all the possible paths in the VAP 1 concatenated with all possible paths in the VAP 2. The determination of the routing path at a given time depends on which air link is used in between VAP 1 and VAP 2. Note that the BS 102 in VAP 1 may not see RS6 (which is a local topologically to VAP 2, thus not externally visible), but BS 102 can see RS5, RS7, and RS8, as these relay stations define the boundaries of the VAP.

Referring again to FIGS. 4 and 5, the contents of the virtual routing table 160 for BS 102 (VAP 1 cell head) and table 162 for RS5 (122) (VAP 2 cell head) are shown one example. In this example, the BS 102 dynamically assigns the path R52→R53→R54 via antenna #1 as the access link to RS5 (of VAP2), based on the measured air link quality (obtained as feedback from RS5). The RS5 dynamically assigns the path R55→R56→R57 via antenna #5 as the access link to MS1. The path from BS to MS1 is thus BS→ RS1→R52→R55→R56→R57, and this is the path currently used as the VBS.

In the virtual routing table 160 for the BS, shown in FIG. 4, two entries exist; one for the path currently attached to RS5, and one for the path to MS 140. The first entry 160*a* has VBS-ID VBS0, path list (BS, RS1, RS2), and intra cell next hop RS1. There is no inter cell hop or ingress port for this link. The egress port for this path is antenna #1 of the three sectors. RS5 is the endpoint attachment. The second entry traces the path from BS to the endpoint MS as seen from the perspective of the BS. This entry has VBS-ID VBS1, path list (BS, RS1, RS2, RS5, RS7). The intra cell next is hop RS1, the inter cell next hop is RS5, and the egress port is antenna #1. This path ultimately ends at the MS.

The virtual routing table 162 for RS5 includes one entry 162*a* tracing the currently selected path from the BS in VAP 1 to the MS attached to VAP 2 as seen from the perspective of the RS5. Thus the path entry 162*a* is BS→ RS1→ RS2→R55→RS6→RS7. The path is assigned VBS-ID VBS1. The intra cell next hop for RS5 is RS6. The inter cell next hop is the MS1. The ingress port is antenna #4 (from RS2), and the egress port in antenna #5 (to RS6). It is thus seen that the VBS "VBS1" describes the VBS as outlined in FIG. 3. Depending on which air links are enabled, data will be relayed from BS to RS5 and on to the MS, while the MS communicates using VBS identifier VBS1 as if it were communicating with BS 102, when it is actually communicating with RS7.

In other words, one can see that the end-to-end data relay from the BS to the MS involves a virtual BS, named VBS1, which in turn is a partition of two VAPs (VAP1 and VAP2). It requires collaboration between the BS and RS5, which are the VAP1 and VAP2 cell head nodes respectively, to provide the collective topology management and the associated radio resource allocation. For example, in FIG. 4 and FIG. 5, the tunnel CID T-CID1 represents this collaborative relationship between VAP1 and VAP2.

The mobility of RS5 via the various air links to/from RS2, RS3, and RS4 is chosen by the BS and is thus transparent to RS5. Likewise, the mobility of MS via the air links to/from RS7 and RS8 is chosen by RS5 and is thus transparent to MS. As the link quality of the various links changes, the RS5 and/or the MS will transparently move between the air links, and the virtual routing tables for BS x and RS5 will be updated accordingly. Meanwhile the MS continues to communicate via VBS1. The handover functionality of 802.16 needs only be implemented between VAPs, for instance between VAP 2 and VAP 3 (as indicated by arrow 154).

Figure 6:
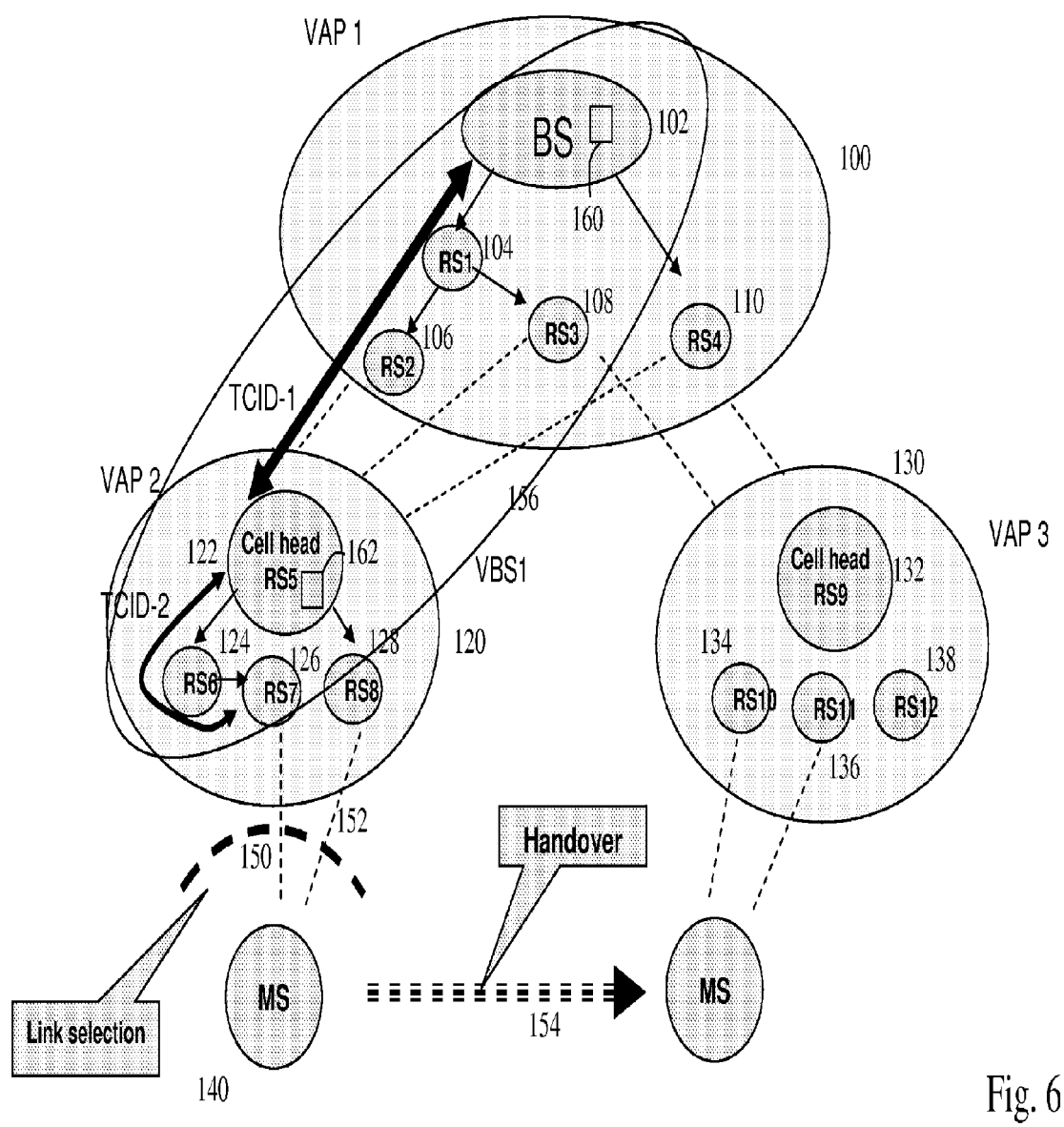
FIG. 6 is a schematic diagram of a multi-hop relay network employing virtual access points and VBS in accordance with the invention, using local T-CIDs.

In FIG. 3, the collective topology management and the associated radio resource allocation between VAP1 and VAP2 is represented by a global tunnel CID T-CID1. That is, T-CID1 is recognized as a unique T-CID by both VAP1 and VAP2. Alternatively, as shown in FIG. 6, local T-CIDs may be employed. In this case, the end-to-end data relay occurs via two T-CIDs, herein shown as T-CID1 and T-CID2. T-CID one is used to tunnel data between BS of VAP1 and RS5 of VAP2. T-CID2 is used to tunnel data between RS5 of VAP2 and RS7 of VAP2. In FIG. 5, the VBS routing table for RS5 would include the tunnel CID T-CID2 instead of T-CID1. During end-to-end data relay, a tunnel CID swapping mechanism manages the switching of T-CID information. See co-pending U.S. Patent Application Publication No. 2007/0072604 to Wang, which is incorporated by reference for further details regarding this swapping mechanism.

It is now noted that, if the subordinate relay stations within the VAPs 1 and 2 of FIG. 3 are not present, the VAPs collapse to the simpler case of a BS and RS in a tree topology, as was shown in FIGS. 1 and 2. In this case, Inter-cell hop and port information is not required in the VBS routing tables. For clarity of description, this simpler model of the MMR network will be used in the following examples.

Auto Discovery and Data Relay

In accordance with the invention, the cell head for a given MMR tree is capable of automatically ascertaining the topology of the MMR tree subordinate to it, and automatically creates VBS's appropriate for this topology. This is referred to herein as "auto discovery". Furthermore, once auto discovery is complete, data can be relayed from a source, across the nodes of the VBS, to a destination. This process is referred to as "VBS relay".

Referring to FIG. 6, VBSs' are defined as follows. First of all, every BS is a VBS. Then, if an RS is attached to a VBS, the combination of the VBS and RS is a new VBS. Each VBS can thus be represented by a path list which is a branch of the MMR tree. Thus, the total number of VBS is proportional to the total number of RS in an MMR tree. As can be seen in FIG. 6, an MMR tree is shown. BS 200 is the root of the tree. RS1 (202) is attached to the BS 200. RS 2 (204) is also attached to BS 200. RS 3 (206) is attached to RS2. There are four VBS defined for this MMR tree. The BS 200 at the root of the MMR tree is VBS1. MS1 (208) is attached to VBS1. VBS2 is defined as (BS, RS1). MS2 (210) is attached to VBS2. VBS3 is defined as (BS, RS2). VBS4 is defined as (BS, RS2, RS3). MS3 (212) is attached to VBS4.

Figure 7:
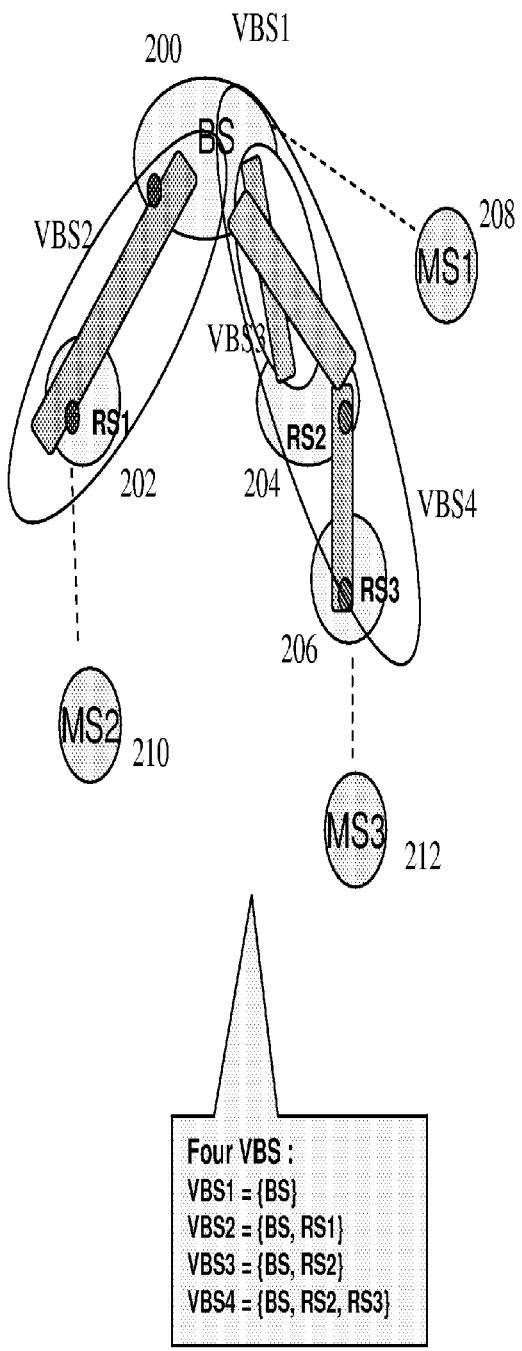
FIG. 7 is a schematic diagram of a multi-hop relay network employing VBS and further showing VBS paths.

Mechanisms are provided for VBS topology auto discovery and subsequent VBS relay. The high level MMR system behaviour for VBS relay is shown in FIG. 7. Further detail regarding the "Tunnel CID" or "T-CID" referred to hereinafter is can be found in co-pending U.S. patent application Ser. No. 11/478,719, titled "Method and System for a Wireless Multi-Hop Relay Network", incorporated fully by reference herein. First, an RS attaches to a BS in the MMR tree (300). A VBS topology auto discovery process then occurs as will be further described (302). The BS allocates a VBS-ID and T-CID for the RS (306) and stores it in its VBS routing table. The RS adds the VBS ID and Tunnel CID information in its VBS table (308). The process continues for each RS along the branch. Finally, an MS attaches to the last RS in an MMR tree branch (310). The BS adds the MS to the VBS routing table (312), and the tunnel CID relay between the MS and BS can commence (314).

Figure 8:
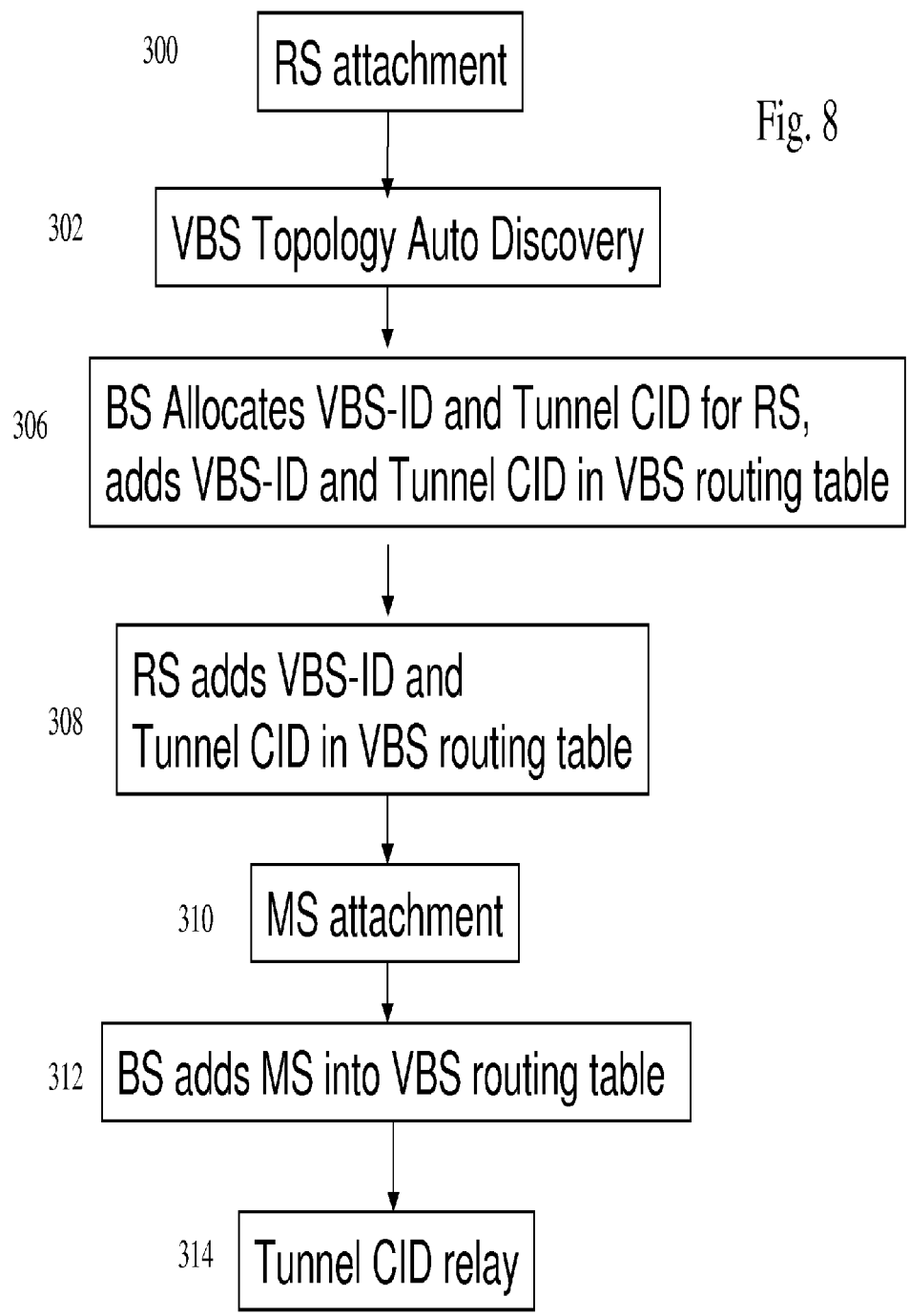
FIG. 8 is a system level flow diagram of VBS creation, auto discovery, and tunnel relay functions according to the invention.
Figure 9:
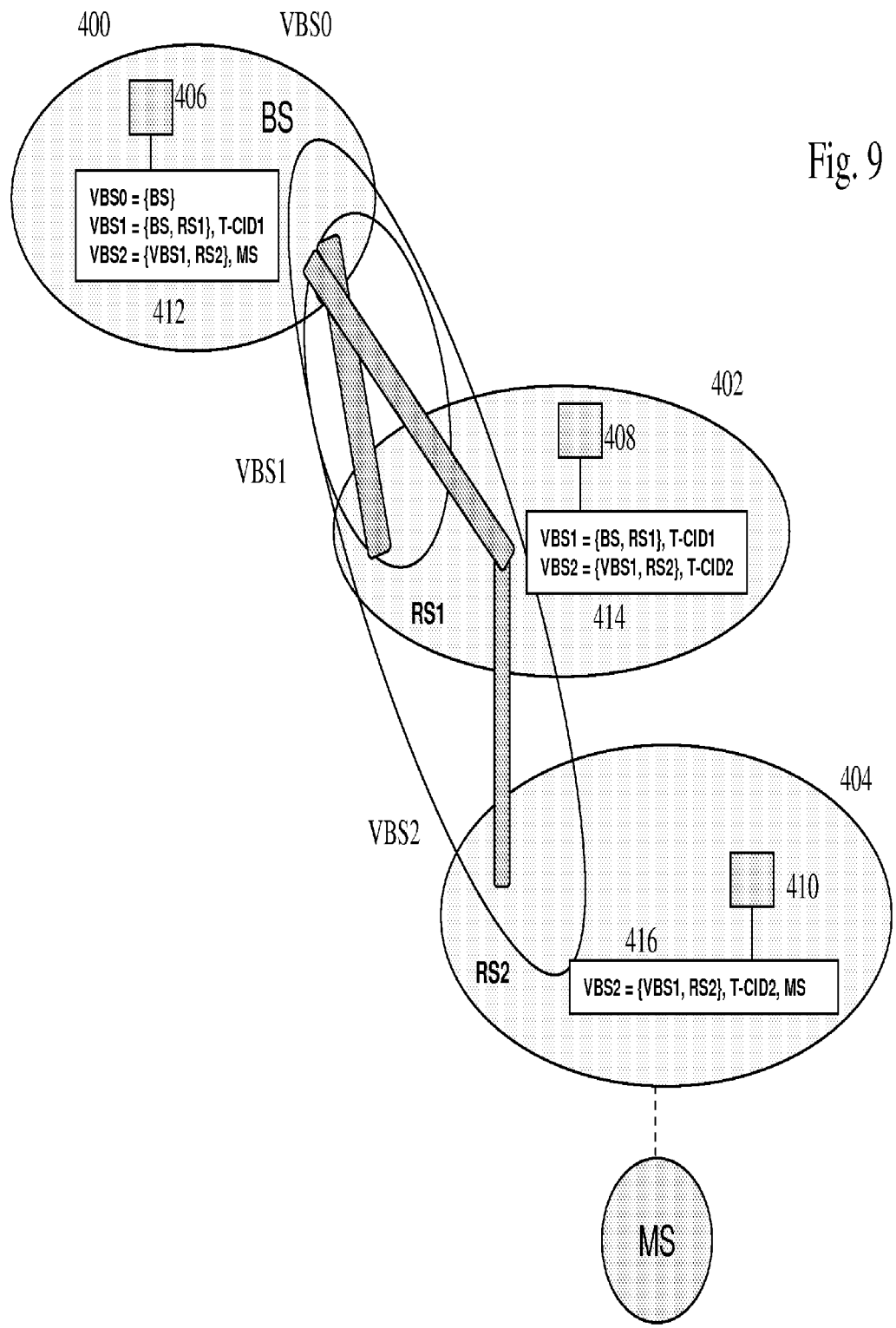
FIG. 9 is an example MMR branch showing VBS and VBS routing tables.

This process will be described as it applies to the example branch of an MMR tree of FIG. 8 and the working flow diagrams of FIGS. 9 and 10. In FIG. 8, a BS 400 is coupled to an RS1 402, which is further coupled to an RS2 404. In order to implement the VBS functionality, each BS and RS includes a VBS controller function element as shown in FIG. 8. The BS includes VBS controller 406. The RS1 includes VBS controller 408. The RS2 includes VBS controller 410. Each VBS controller creates and maintains a VBS routing table that includes all routing paths from this node (BS or RS) to all the nodes in its subordinate tree. In this example the BS includes VBS routing table 412. The RS1 includes VBS routing table 414. The RS2 includes VBS routing table 416. Each routing path entry includes a VBS-ID, a path list, a T-CID. The routing table entry associated with the last RS in the branch also includes an endpoint ID. In FIG. 8, each VBS routing table is shown with its contents after autoconfiguration is complete. Each VBS routing table 412, 414, 416 is created and maintained by using a BS-oriented source routing protocol (pending U.S. patent application Ser. No. 11/478,719), and the signalling messages as currently defined in 802.16 (802.16e-2005)—that is, no new messages are required to implement the invention. In particular, the VBS routing tables are created through use of DL-MAP, RNG-REQ, RNG-RSP, and DSAx messages. New TLVs are defined for these messages to include an explicit route, which is a path list consisting of the relay node IDs in a VBS.

Auto discovery operates generally as follows. The BS periodically broadcasts the cell preamble and DL-MAP to all subordinate trees. Initially, the DL-MAP contains the BS-ID as the initial node along the branch. When each attached RS that has already entered the network receives the DL-MAP, it replaces the BS-ID field in the DL-MAP with its VBS ID and further broadcasts DL-MAP to its subordinate tree. When a new (unattached) RS receives the DL-MAP, it copies the received VBS ID (which is that associated with the RS from which it received the DL-MAP ("access RS")) into a RNG-REQ message and sends it back to the BS. Along the backward direction, each receiving RS forwards RNG-REQ upstream. Eventually the BS receives the RNG-REQ message. Based on pre-learned topology and the VBS ID from the access RS, the BS creates a new path entry and VBS ID for the newly attached RS in its routing table, and issues a RNG-RSP message containing the new VBS-ID to the new RS to finish the network entry operation for this new RS. This RNG-RSP message is tunnelled to the designated access RS (i.e. the RS designated in the RNG-REQ) via the T-CID previously allocated to the designated access RS. In turn, the access RS forwards the RNG-RSP message downstream to the new RS. Once the entry stage for the new RS is complete, the BS sends a DSA-REQ (Dynamic Service Add) message with the new created path in the explicit route TLV to configure T-CID for the new RS. DSA messages are not tunneled. Each RS along the way checks destination RS's node ID and the explicit route TLV carried by the DSA message to see if it self is in the explicit route and if the path is a new path. If not, the RS just simply drops this message. Otherwise, the RS creates a new entry in its VBS routing table to store the new routing path list, VBS ID, and the T-CID associated with the searched entry for relay purposes. The RS then further sends the DSA message to the subordinate tree. Eventually all the RS along the branch acquire the new path, new VBS ID and the T-CID and store it in their VBS routing tables.

Up to this point, the MMR network has created the overall VBS architecture and T-CID paths. Now, when an MS attaches to an RS, it first receives a cell preamble and DL-MAP message containing the access RS's VBS ID, and sends an initial RNG-REQ message to begin the network entry process. The RS attached to the MS copies the VBS ID from its VBS routing table into the RNG-REQ message and relays it back to the BS. Based on the VBS ID, now the BS has the knowledge of what T-CID should be used to deliver data bursts to the MS. When the BS sends the data bursts to the target MS, it builds normal DL-MAP-IE messages with an added T-CID. Now the RS participate in the VBS relay operation. Each RS merely decodes DL-MAP-IE to the T-CID. By checking the VBS routing table, the RS determines if it should further relay the burst down the tree or simply drop it. Eventually the last access RS receives the DL frame, decodes the DL-MAP and the data burst to get MS CID, and forwards each MS's MAC PDU downstream. In accordance with an advantage of the invention, each intermediate RS along the BS-MS MMR path need only check the T-CID to relay the DL frame. There is no need to decode the data burst to check the MS MAC address to forward the packet.

In accordance with an implementation of the invention, the RNG-RSP and DSA-REQ signalling messages used in the above described process utilize new TLVs in accordance with the invention. In FIG. 10 there is shown a VBS-ID TLV 420, having syntax "VBS_ID" (422) and length 24 bits (424). The TLV list for the 802.16 RNG-RSP message is extended to include this TLV. It is used by the BS to convey a new VBS-ID to an RS. In FIG. 11 there is shown an explicit route TLV 430. This TLV is used by the BS to convey a path list associated with a VBS to an RS in a DSA-REQ message. A first entry 432 represents the number of entries in the list (434) and has a size of 16 bits (436). It is followed by an entry 438 including the list of CIDs (each size 16 bits, 440) for each node (i.e. RS) in the VBS path.

Figure 12:
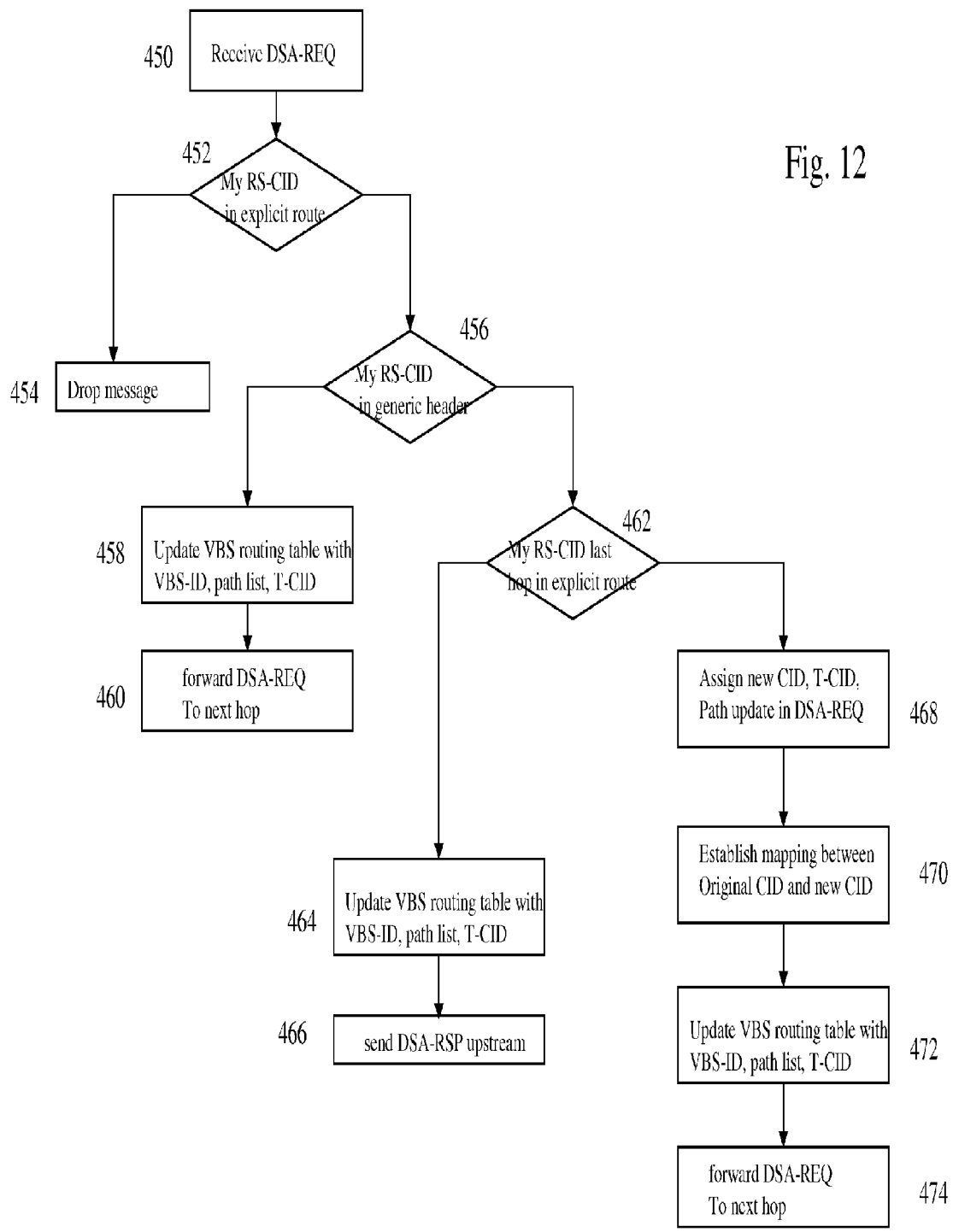
FIG. 12 is a flow chart showing RS processing of a DSA-REQ message as part of the VBS auto discovery process in accordance with the invention.

Further detail as to how an RS processes a DSA-REQ message having an explicit route TLV is shown in the flow chart of FIG. 12. Upon receipt of a DSA-REQ message (450), the RS checks to see if its own CID, denoted herein as RS-ID, is in the explicit route list (452). If it is not, then the message is destined for a node that is not in a VBS containing any RS subordinate tree. Therefore the message is dropped (454). If it is in the list, the RS then checks to see if its RS-ID is in the generic MAC header—i.e. is this MAC PDU addressed to this RS? (456). If not, this means the message is directed to a downstream RS that is part of a VBS associated with this RS. So the RS updates its routing table with the VBS-ID, path list, ant T-CID for the destination RS and forwards the DSA-REQ to the next hop RS (458). If the RS-ID is found in the generic header, then the RS checks to see if it is the last hop in the explicit route (462). If it is the last hop, it updates its routing table with its VBS-ID, path list and T-CID (464), and sends a DSA-RSP message back to the BS (466). If it is not the last hop, this means the explicit path is crossing a VAP boundary into a new VAP with new CIDs and T-CIDs. In this case it adds new CIDs, T-CID, and path information in the DSA-REQ (468). It then establishes a mapping between the old and new CIDs (470). Then the RS updates its routing table with the VBS-ID, T-CID and path information (472), and forwards the DSA-REQ to the next hop in the new VAP (474).

Figure 13:
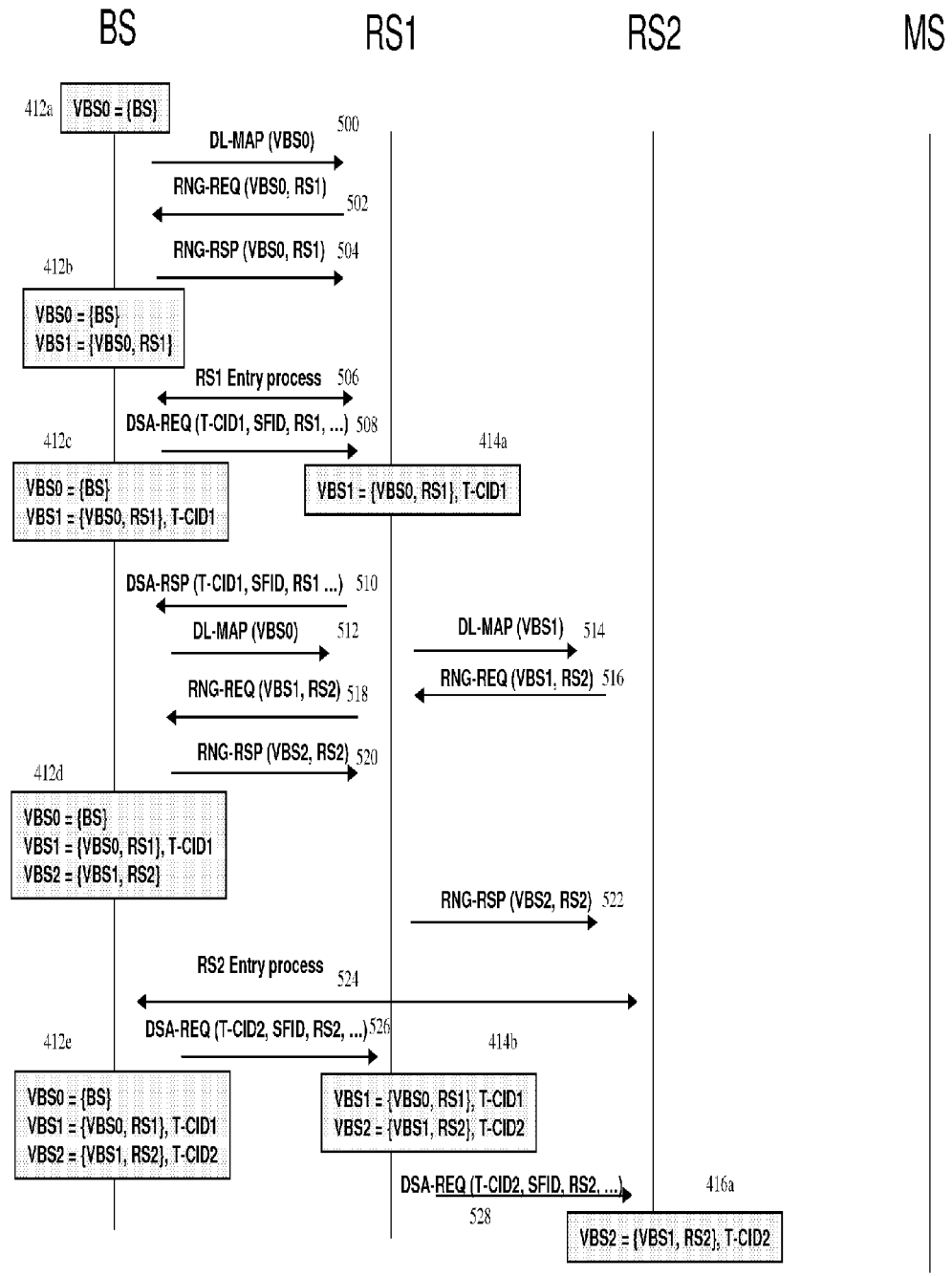
FIG. 13 is a working flow diagram showing VBS auto discovery.
Figure 14:
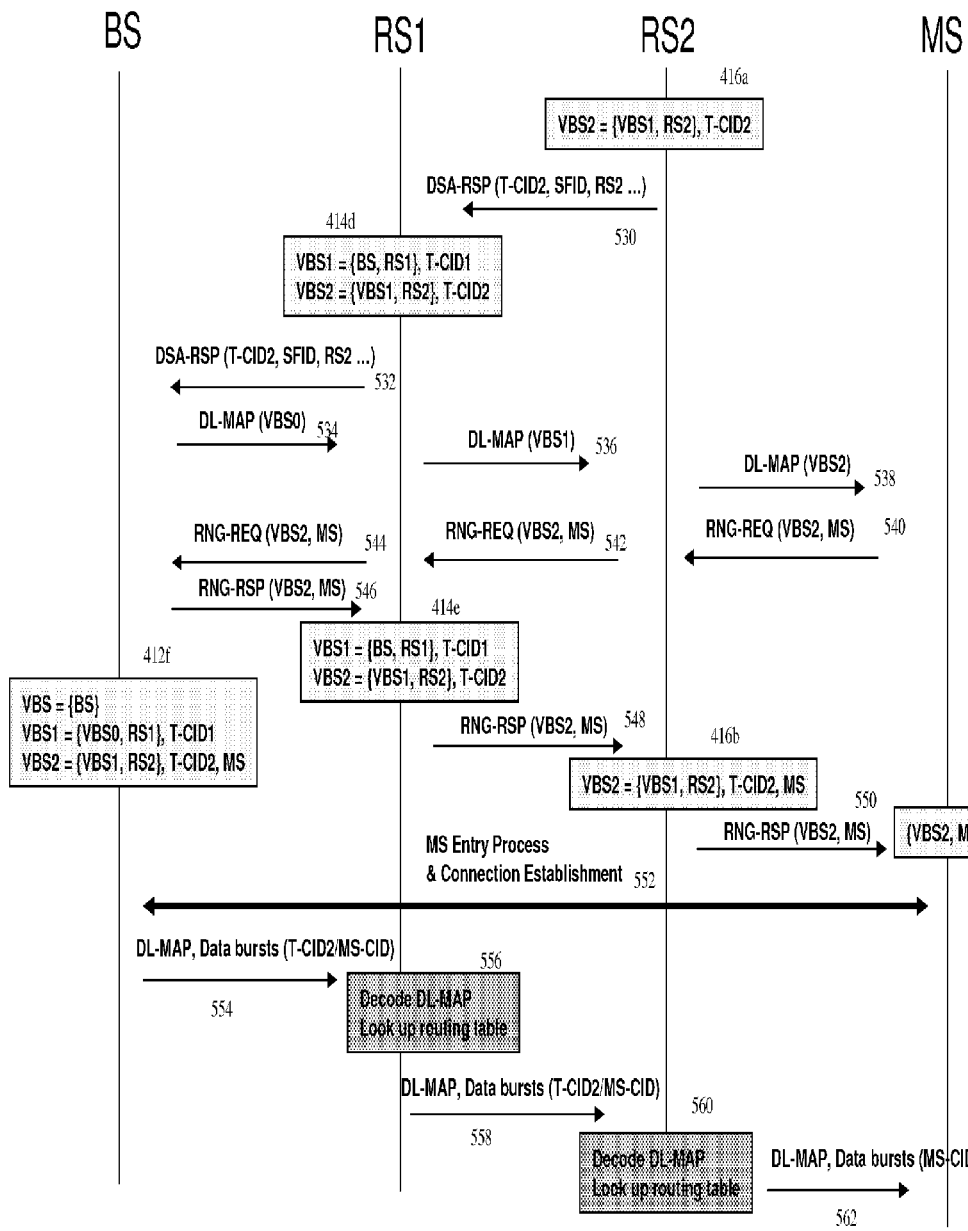
FIG. 14 is a continuation of the working flow diagram of FIG. 13.

The auto configuration process is now shown in detail with reference to the working flow diagrams of FIGS. 13 and 14. In this example, the BS 400, RS1 402, and RS2 404 serve as a VBS and tunnel relay for an MS. Each VBS table is shown as it is progressively built by reference numbers 412*a-n*, 414*a-n*, 416*a-n*. Before any RS are attached, the BS recognizes itself as a VBS, as indicated by path list VBS0={BS} in table 412*a*. The process begins when the BS broadcasts a DL_MAP message (500). This DL-MAP message contains the VBS0 (as indicated by DL-MAP(VBS0)). The RS1 (that has not yet entered the network) receives the DL_MAP message from the BS, and sends a RNG-REQ message including itself and VBS0 (as indicated by RNG-REQ(VBS0,RS1) (502). The BS then builds a new entry in its VBS routing table associating VBS1 with (BS, RS1) (412*b*). The BS then sends a RNG-RSP message back to the RS1 (504). This RNG-RSP message includes the assigned VBS-ID VBS1. RS1 builds a VBS routing table which includes an entry for VBS1. Now RS1 performs the 802.16 entry process for attaching to the BS (506). The BS now selects a tunnel CID that will be used for VBS relay via RS 1. The BS updates its routing table entry for VBS1 to associate VBS1 with T-CID1 (412*c*). The BS then sends a DSA request containing the new explicit route (BS, RS1) and T-CID for VBS1, i.e. T-CID1, to RS1 (508). RS1 updates its VBS routing table entry for VBS1 with the new route and tunnel CID T-CID 1 (414*a*), and then sends a DSA-RSP message back to the BS (510), completing the RS1 entry process.

The BS now sends another DL-MAP(VBS0) message (512). The attached RS1 which has completed the entry process forwards the DL-MAP message downstream with its VBS-ID VBS1 (514). The RS2 receives the DL-MAP(VBS1) message from the RS1, in the same manner that it would receive a DL-MAP message from a BS. The RS2 then begins the entry process by sending a RNG-REQ message identifying VBS1 and RS2 (itself) (516). When RS1 receives the RNG-REQ message, it forwards it to the BS (518). The BS produces a new entry for its VBS routing table associating a new VBS-ID VBS2 with the path (VBS1,RS2) (412*d*). The BS issues a RNG-RSP message with the VBS2 information (RNG-RSP(VBS2,RS2) (520) and tunnels this message using TCID-1. RS1 receives and un-tunnels the RNG-RSP message. RS1 builds a new entry for VBS2 in its VBS routing table. The RNG-RSP (VBS2,RS2) message is then forwarded on to RS2 (522). RS2 updates its VBS routing table with an entry for VBS2 and completes the entry process (524). The BS now selects a tunnel CID that will be used for VBS2. The BS updates the VBS routing table to associate VBS2 with T-CID2 (412*e*). The BS then sends a DSA request containing the new explicit route (VBS1, RS2) and tunnel CID T-CID2 for VBS2 (526). RS1 updates its VBS routing table entry for VBS2 with the new route (VBS1,RS2) and tunnel CID T-CID2 (414*b*), and sends the DSA-REQ(T-CID2) message downstream to RS2 (528). RS2 updates its VBS routing table to associate VBS2 with new route (VBS1, RS2) and tunnel CID T-CID2 (416*b*). A DSA-RSP(T-CID2) message is returned to RS1, and then to the BS (530, 532).

The BS then issues another DL-MAP (VBS0) message (534). RS1 in turn sends a DL-MAP(VBS1) message downstream (536). RS2 receives the DL-MAP (VBS1) and sends a DL-MAP(VBS2) message downstream (538). An MS receives this message. The MS now interacts with VBS2 just as it would with a BS in a single hop PMP network. The MS begins the network entry process by sending a RNG-REQ message to the source of the DL-MAP—that is, MS sends a RNG-REQ(VBS2, MS) message (540). This RNG-REQ (VBS2,MS) message is sent up the tree to the BS via the T-CID associated with VBS2—i.e. TCID2 (542, 544). The BS finds the VBS2 entry in its VBS routing table and updates it by adding MS to the path list (412*f*). The BS then issues a RNG-RSP(VBS2, MS) message (546) via tunnel TCID2. By checking the routing table, RS1 transparently relay RNG-RSP to RS2 (414*e*, 548). RS2 un-tunnel the received message, updates its VBS2 path entries to include MS (416*b*), and relay the RNG-RSP message (550). The MS then receives the RNG-RSP(VBS2,MS) message. The MS entry process and connection establishment now occurs between the BS and MS (552). Note that the MS knows of communications only with VBS2. But VBS2 is associated with T-CID2, so all communications between BS and MS are relayed via RS1 and RS2 over the T-CID2 connection. Once the MS connection is established, the BS sends DL frames containing DL_MAP_IE for the MS-CID, and data bursts for the MS-CID, encapsulated in the T-CID2 (554). The relay station RS1 decodes the DL_MAP and looks up the TCID2 in its routing table (556) and relays the DL frame down the VBS2 path to RS2 (558). The RS2 decodes the DL-MAP and looks up T-CID 2 in its routing table (560) and sees that it is the endpoint for T-CID2, so it de-encapsulates the DL frame and sends it on to the MS (562). The MS then decodes the DL-MAP-IE for its MS CID in the normal 802.16 manner.

In accordance with one advantage of the invention, each RS along the MMR path need only check the T-CID to relay the DL frame. There is no need to decode the data burst to check the MS MAC address to forward the packet. In large trees where RS are associated with many MS, the T-CID relay offers significant efficiencies.

Mobility

In a wireless multi-hop relay access network such as that of FIG. 1, a mobile subscriber station (MS) may move within the network. For instance, a laptop or PDA may be carried by its user from one location in the network to another. The MMR nework maintains network connectivity with the MS by adjusting the manner in with the MS accesses the network.

When an MS is attached to a particular BS or RS, it may move a short distance, in which case transmission power adjustments and advance time adjustments can be made to accommodate the movement. Or, the MS may move so far from the BS or RS that it must transition to use a different radio link to the BS or RS. (e.g. FIG. 3 "x"). Or, the MS may move so far from the BS or RS that a "handover" must occur from the BS or RS such that network access is now provided by a different BS or RS. In addition, an RS in the network may also be a mobile device. As such, it may move just as described above with regard to the MS, and MS and RS may be mobile simultaneously.

In accordance with the invention, MS and RS mobility may occur within an MMR network in the same manner that MS mobility is handled in a PMP 802.16 network, except that handover occurs between VBS rather than BS. In FIG. 11, a BS BS1 (600) is shown having two subordinate VBS, VBS1 (602) and VBS2 (604). And handover of an MS (606) from VBS1 to VBS2 would be an intra-tree handover, controlled by the VBS controller 607 in the BS 1. Another BS BS2 (608) has a subordinate VBS VBS3 (610). A handover of an MS (612) from VBS3 to VBS2 would be an inter-tree handover. This handover would be controlled by the VBS controller 613 in BS2 and would involve a handover controller 614 in the ASN gateway 616 that connects the BS1 and BS2.

Figure 15:
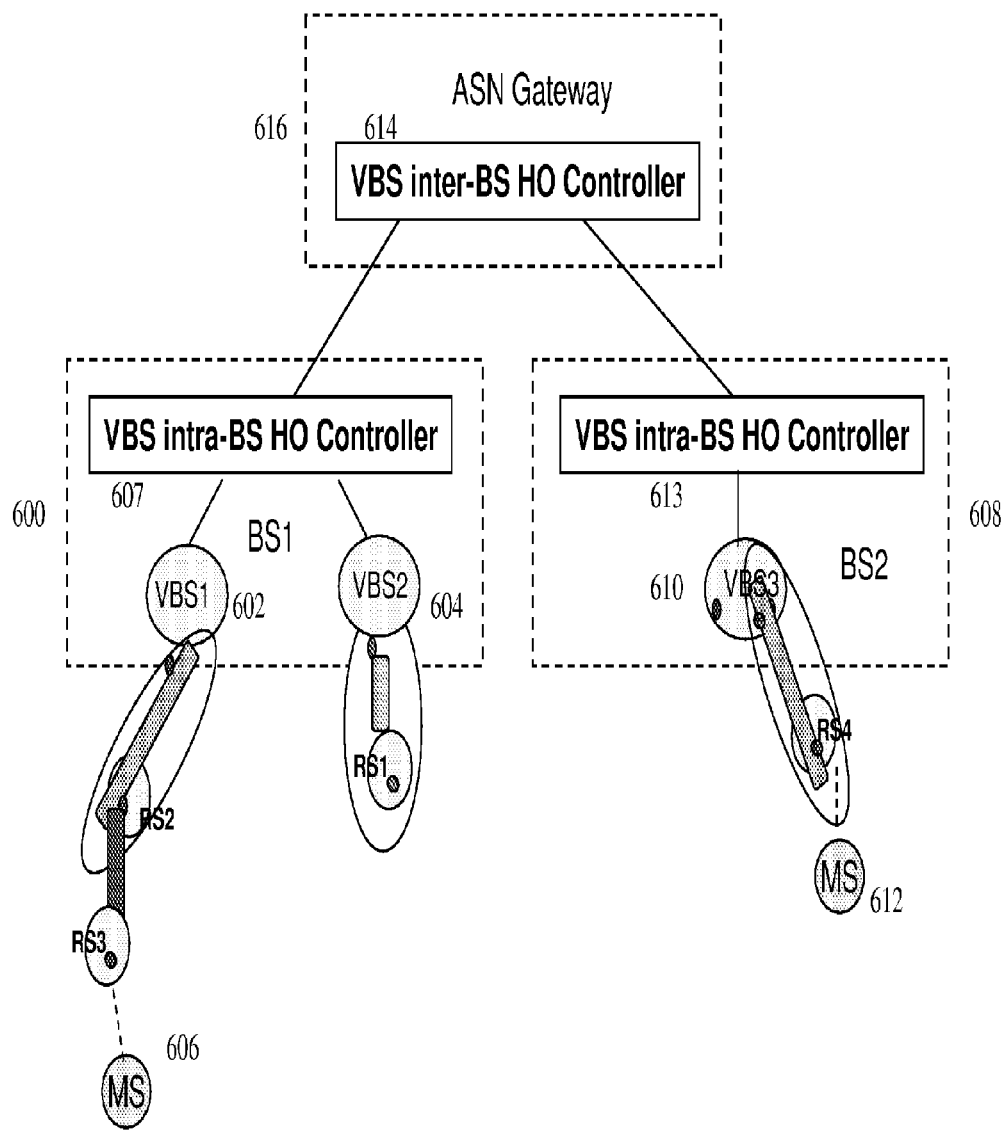
FIG. 15 is a schematic diagram of an MMR network showing intra-BS and inter-BS handover functions.
Figure 16:
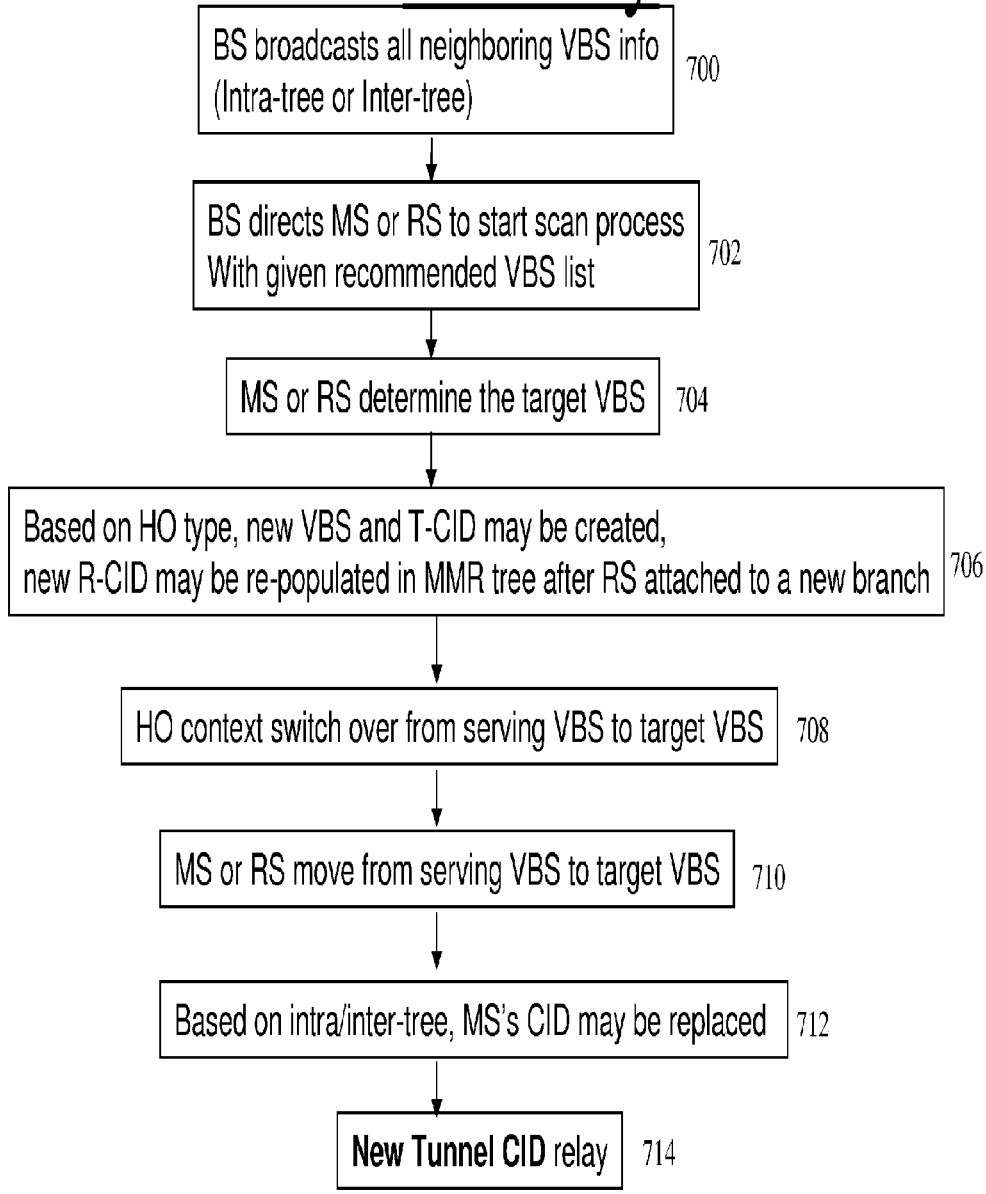
FIG. 16 is a system level flow diagram of MMR mobility in accordance with the invention.

The general MMR system mobility behaviour is shown in FIG. 15. A BS periodically broadcasts all its neighbouring VBS information (both intra-tree and inter-tree) (700). The BS directs an MS or RS to start its scan process with a given recommended VBS list (702). The MS or RS determines a target VBS from the received list (704). A handover then occurs from the serving VBS to the target VBS (706). If an RS is moving, a new VBS and T-CID may be created (708). A context switch occurs from the serving to target VBS (710). If a MS is moving inter-tree, the MS's CID may be replaced (712). Finally, a new tunnel CID relay commences (714).

MS Mobility

Figure 17:
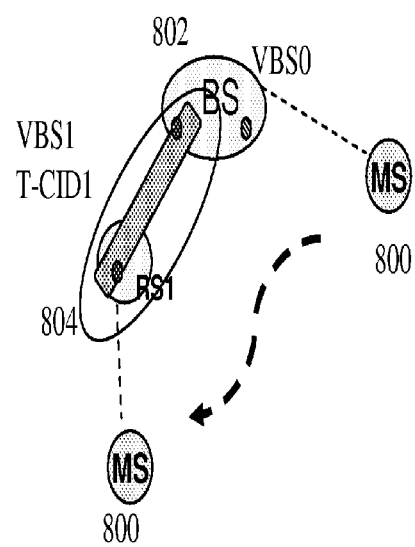
FIG. 17 is a schematic diagram of an MMR network wherein a mobile station (MS) moves from a BS to an RS.
Figure 18:
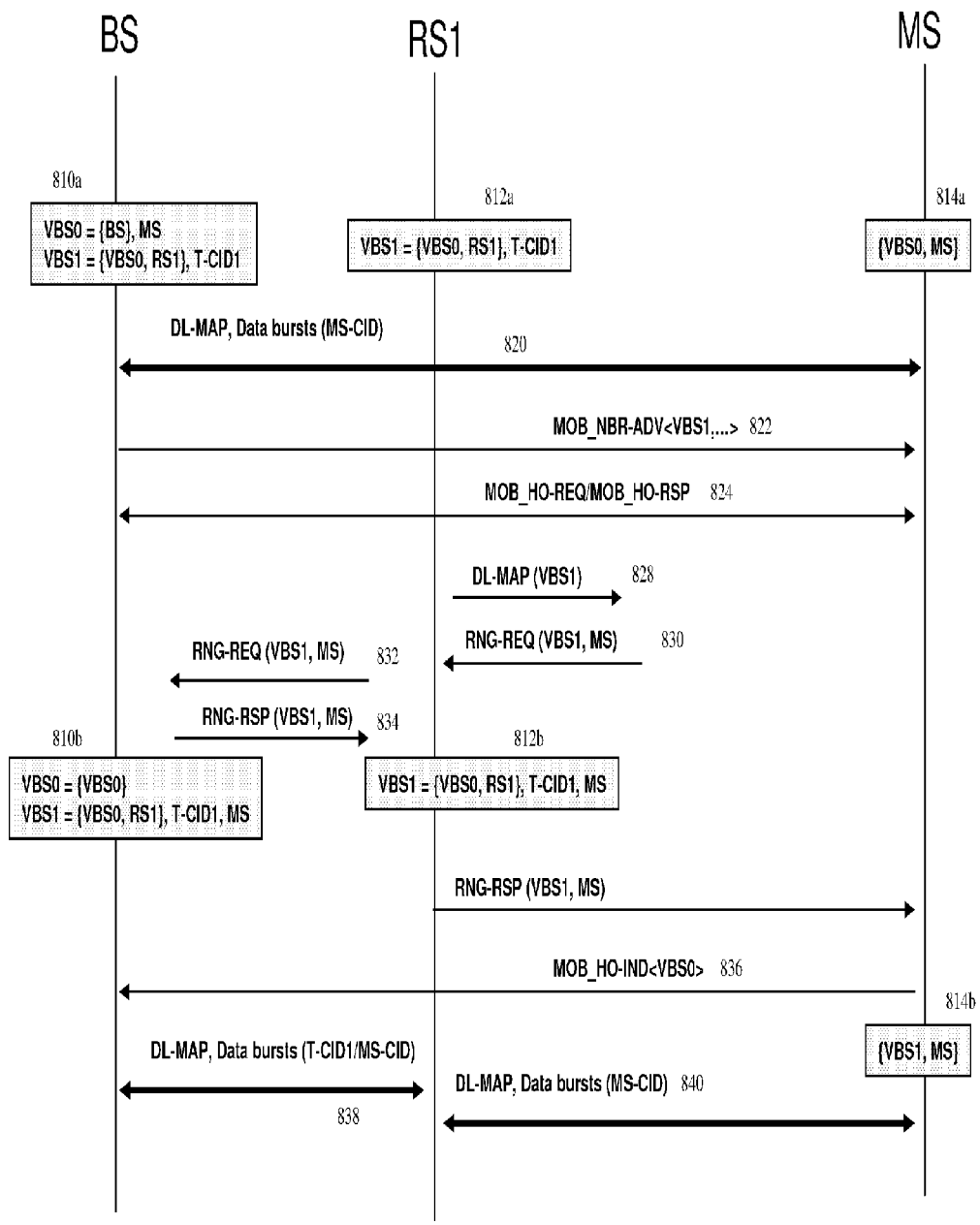
FIG. 18 is a working flow diagram of the message exchanges supporting the MS mobility of FIG. 17.

Referring now to FIG. 17, there is shown an MS 800 that moves intra-tree from a serving BS 802 to a target RS 804. The topology of FIG. 3 includes two VBSs-VBS0 (BS), and VBS1 (BS, RS1). The MS is initially attached to the BS, and is moving to RS1. The current serving VBS is VBS0. The target VBS is VBS1. The working flow diagram for this handover is shown in FIG. 18. Initially, the virtual routing table 810a for BS includes the path for VBS0 (BS), and the path for VBS1 (BS, RS1). The path for VBS1 is associated with a tunnel CID T-CID1. The virtual routing table 812a for RS1 includes the path for VBS1 and T-CID1. The MS is shown attached to the BS (814a). DL-MAP and data bursts are exchanged directly between the BS and MS via the MS' CID. The current serving VBS, VBS0, broadcasts an MOB_NBR-ADV message to the MS in accordance with 802.16 (820). The MOB_NBR-ADV message includes VBS-IDs recommended for handover—in this case, VBS1. The MS starts its scan process with the recommended VBS list in the advertisement message. Meanwhile, the MS receives a preamble and DL-MAP message from the RS1 including the VBS-ID VBS1 (828). The MS sends an HO request message to the serving VBS (i.e. BS) including the chosen target VBS1, and the BS sends an HO response back (824). The MS uses the new VBS1 for initial ranging. RNG-REQ and RNG-RSP messages are relayed from MS to BS via T-CID1 (830, 832, 834). The BS now associates the MS with VBS1 in its routing table (810b). VBS1 is now the target VBS. RS1's routing table is updated to include MS as its endpoint (812b). The MS is now attached to VBS1 (814b). The MS now sends an MOB-HO_IND message to the severing current VBS (i.e. BS) (836). The BS redirects all data flow for the MS to the target VBS1 by putting the VBS1's T-CID in the DL-MAP (838). VBS1 now relays data bursts to the MS (840).

Figure 19:
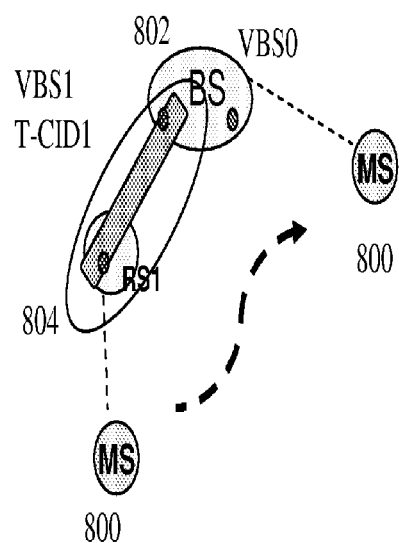
FIG. 19 is a schematic diagram of an MMR network wherein an MS moves from an RS to a BS.
Figure 20:
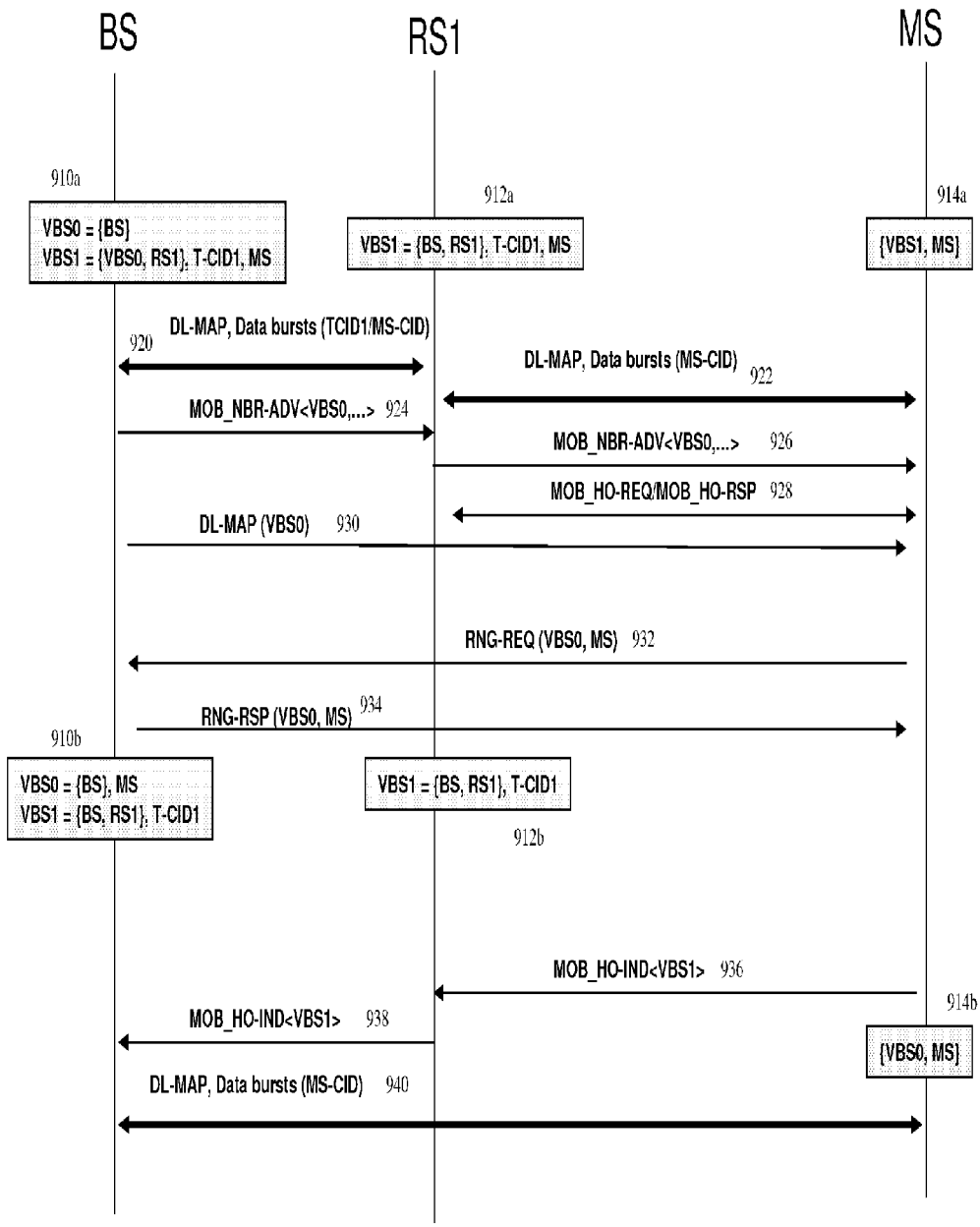
FIG. 20 is a working flow diagram of the message exchanges supporting the MS mobility of FIG. 19.

In FIG. 19, the same MMR tree is shown, but this time the MS 800 moves intra-tree from serving VBS1 to target VBS0. The MS is initially attached to RS1, and is moving to BS. The current serving VBS is VBS1 (BS, RS1). The working flow for this handover is shown in FIG. 20. Initially, the virtual routing table 910 for the BS includes the path for VBS0 (BS), and the path for VBS1 (BS, RS1). The path for VBS1 is associated with a tunnel CID T-CID1 and the endpoint MS. The virtual routing table 912a for RS1 includes the path for VBS1 (BS, RS1), the tunnel CID T-CID1, and the endpoint MS. Prior to handover, data bursts are relayed via T-CID1 between BS and MS (920, 922). Then, the BS broadcasts an MOB_NBR-ADV message (924), which is broadcast by the downstream VBS1 (926). The MOB_NBR-ADV message includes a list of VBS-IDs recommended for handover—in this case, VBS0. The MS starts its scan process with the recommended VBS list in the advertisement message. The MS exchanges HO request and HO response messages with the serving VBS VBS1 including the chosen target VBS0 (928). Meanwhile, the MS receives a preamble and DL-MAP message from the BS including the VBS-ID VBS0 (930). The MS uses the new VBS0 for initial ranging, exchanging RNG-REQ and RNG-RSP messages with VBS0 (932,934). The BS now associates the MS with VBS0 in its routing table (910b). RS1's routing table is updated to remove the MS as the VBS1 endpoint (912b). The MS now sends an MOB-HO_IND message to the severing current VBS1 (936), which sends it on to its root BS (938). The VBS 1 BS redirects all data flow for the MS to the target VBS0 by sending data bursts over VBS0, i.e. directly to the MS (940).

Figure 21:
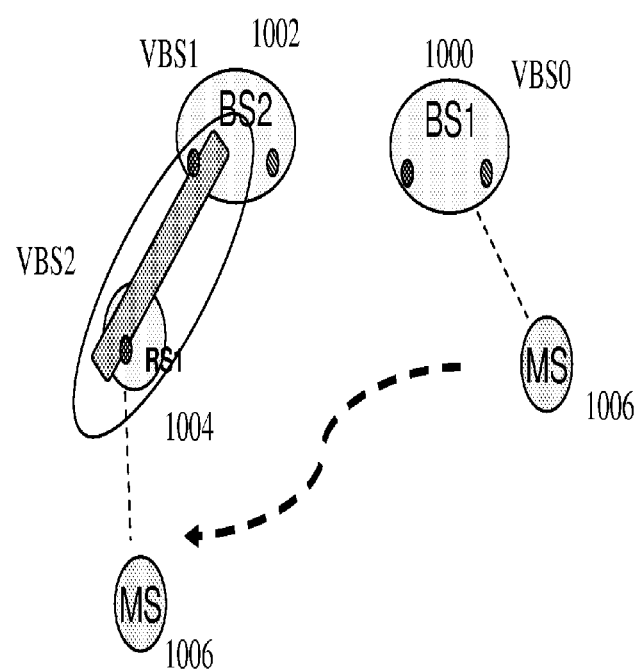
FIG. 21 is a schematic diagram of two MMR trees wherein an MS moves from a BS in one tree to an RS in another tree.

In FIG. 21, two MMR trees are shown. BS1 (1000) is the root of one tree. BS2 (1002) is the root of a second tree. RS1 (1004) is subordinate to BS2. There are three VBSs-VBS0 (BS1), VBS1 (BS2), and VBS2 (VBS1, RS1). An MS 1006 moves inter-tree from BS1 to RS1.

Figure 22:
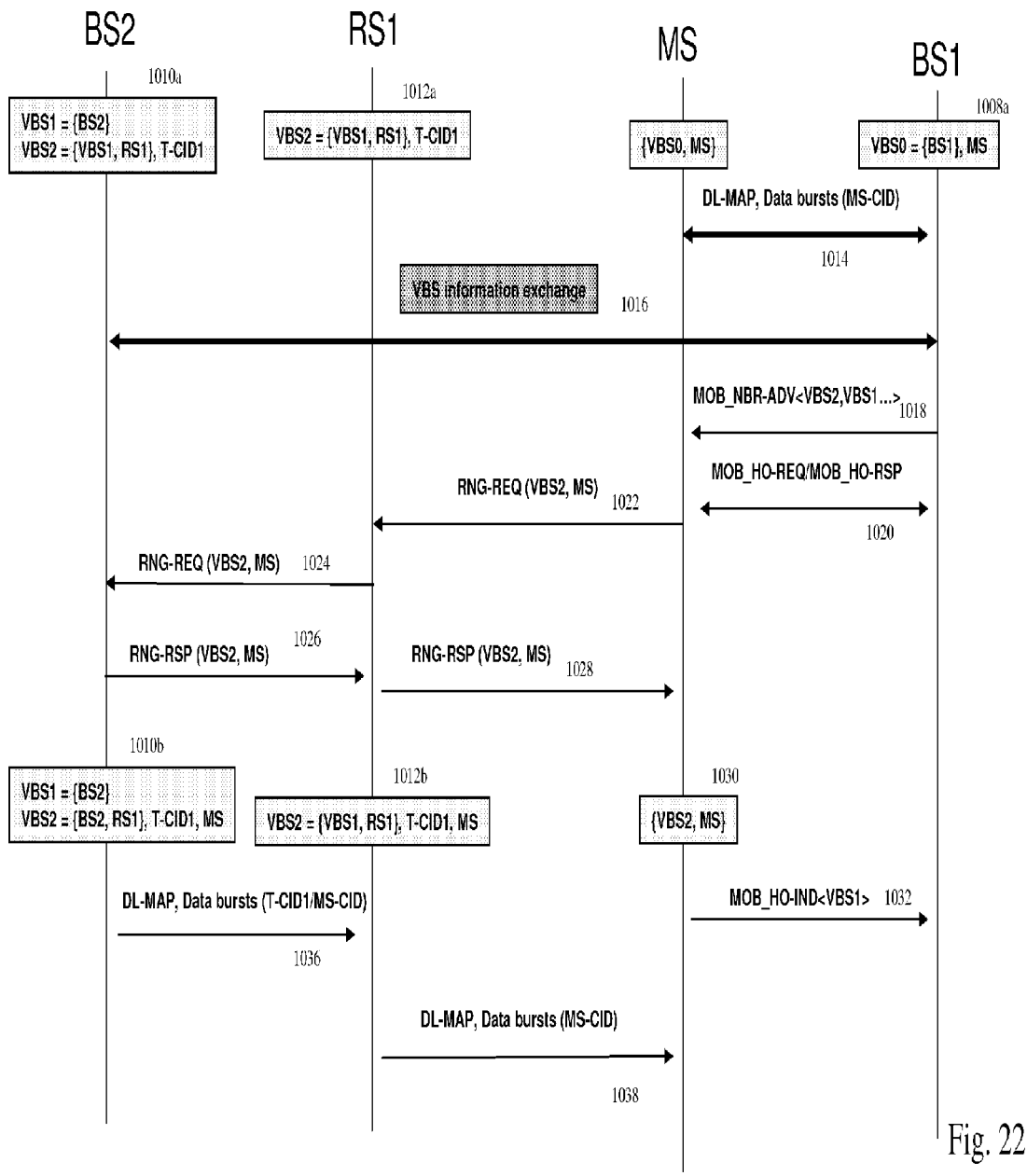
FIG. 22 is a working flow diagram of the message exchanges supporting the MS mobility of FIG. 21.

The working flow diagram for this handover is shown in FIG. 22. Prior to handover, the VBS routing table 1008a for BS1 includes the path for VBS0 (BS1), and associates this path with the endpoint MS. The VBS routing table 1010a for BS2 includes the VBS1 path (BS2), and the VBS2 path (VBS1, RS1) and it's associated T-CID1. The VBS routing table 1012a for RS1 includes the path for VBS2 (VBS1, RS1), and the tunnel CID T-CID1. Prior to handover, DL-MAP and data bursts are exchanged directly between BS1 and MS (1014). Also prior to handover, BS1 and BS2 exchange their VBS routing tables (1016). BS1 now broadcasts an MOB_NBR-ADV message to the MS (1018). The MOB_NBR-ADV message includes VBS-IDs from both trees recommended for handover—in this case, VBS1 and VBS2. The MS starts its scan process with the recommended VBS list in the advertisement message. HO request and response messages are exchanged between the MS and the serving VBS0 (1020). The MS uses the new VBS2 for initial ranging. RNG-REQ and RNG-RSP messages are relayed between the MS and BS2 via the T-CID1 (1022, 1024, 1026, 1028). The BS2 now associates the MS with VBS2 in its routing table (1010b). RS1's routing table is updated to add the MS as its endpoint (1012b). The MS, now attached to VBS2 (as indicated by 1030) now sends an MOB-HO_IND message to the severing current VBS0 (1032). The BS2 redirects all data flow for the MS to the target VBS2 by sending DL-MAP and data bursts via T-CID1 (1036). At RS1, the bursts are decapsulated and sent to the MS via its MS-CID (1038).

Since this handover is to a VBS in a different MMR tree, it may require ASN anchor point involvement (FIG. 15, 616). Furthermore, since the target VBS is in a different MMR tree, the serving VBS BS1 may send an MOB-BSHO-RSP message to the MS to force the MS to adopt a new CID, to ensure no CID conflict in the MS's new tree.

RS Mobility

Figure 23:
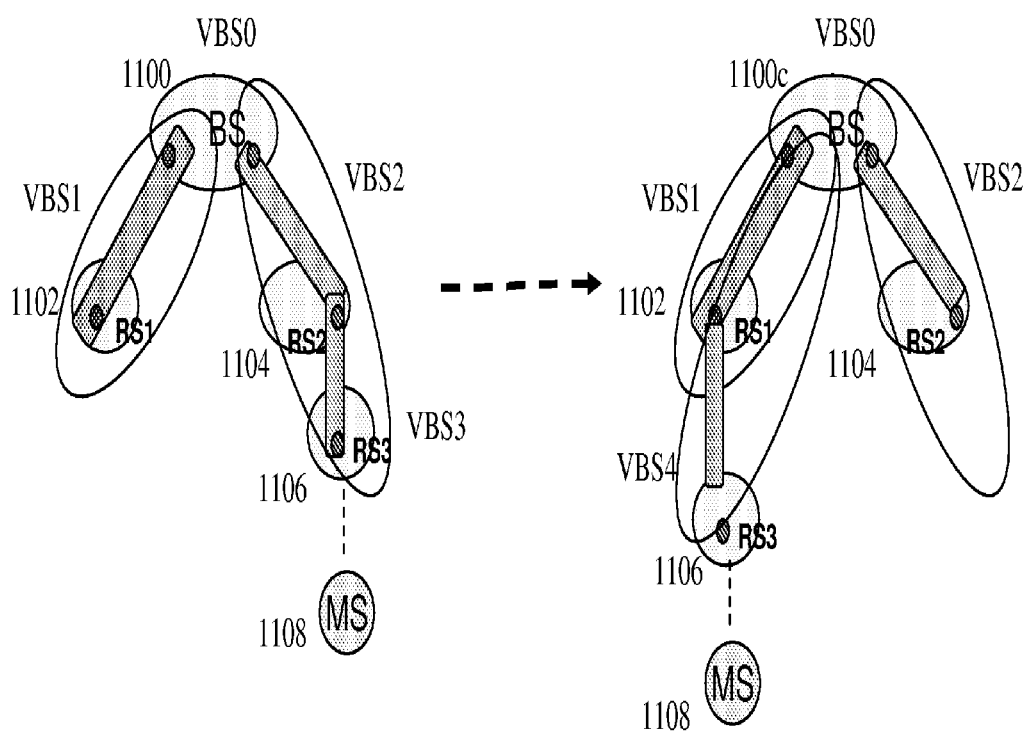
FIG. 23 is a schematic diagram of an MMR network wherein an RS moves from one branch of an MMR tree to another branch of the MMR tree.
Figure 24A:
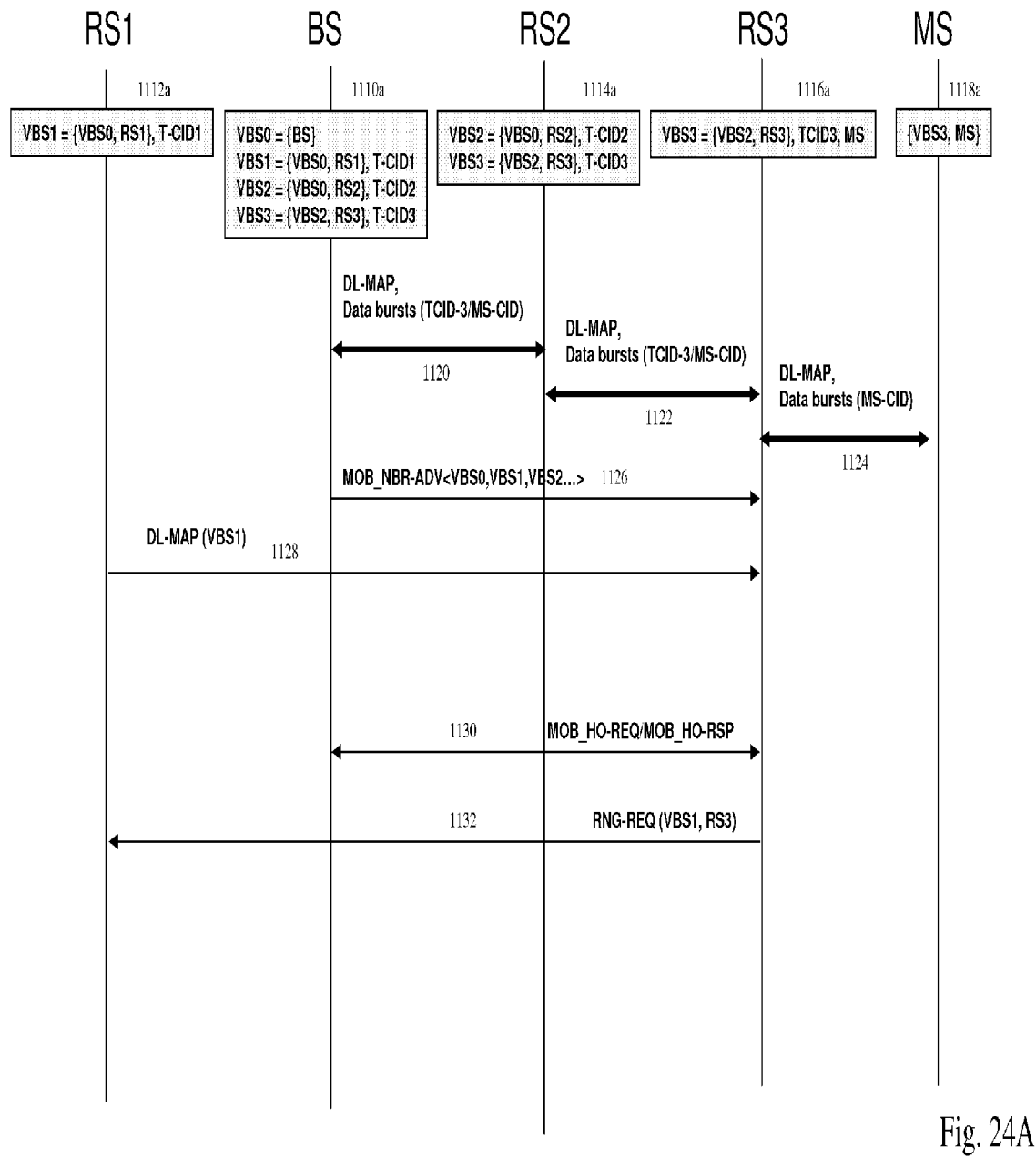
FIG. 24A is a working flow diagram of the message exchanges supporting the RS mobility of FIG. 23.
Figure 24B:
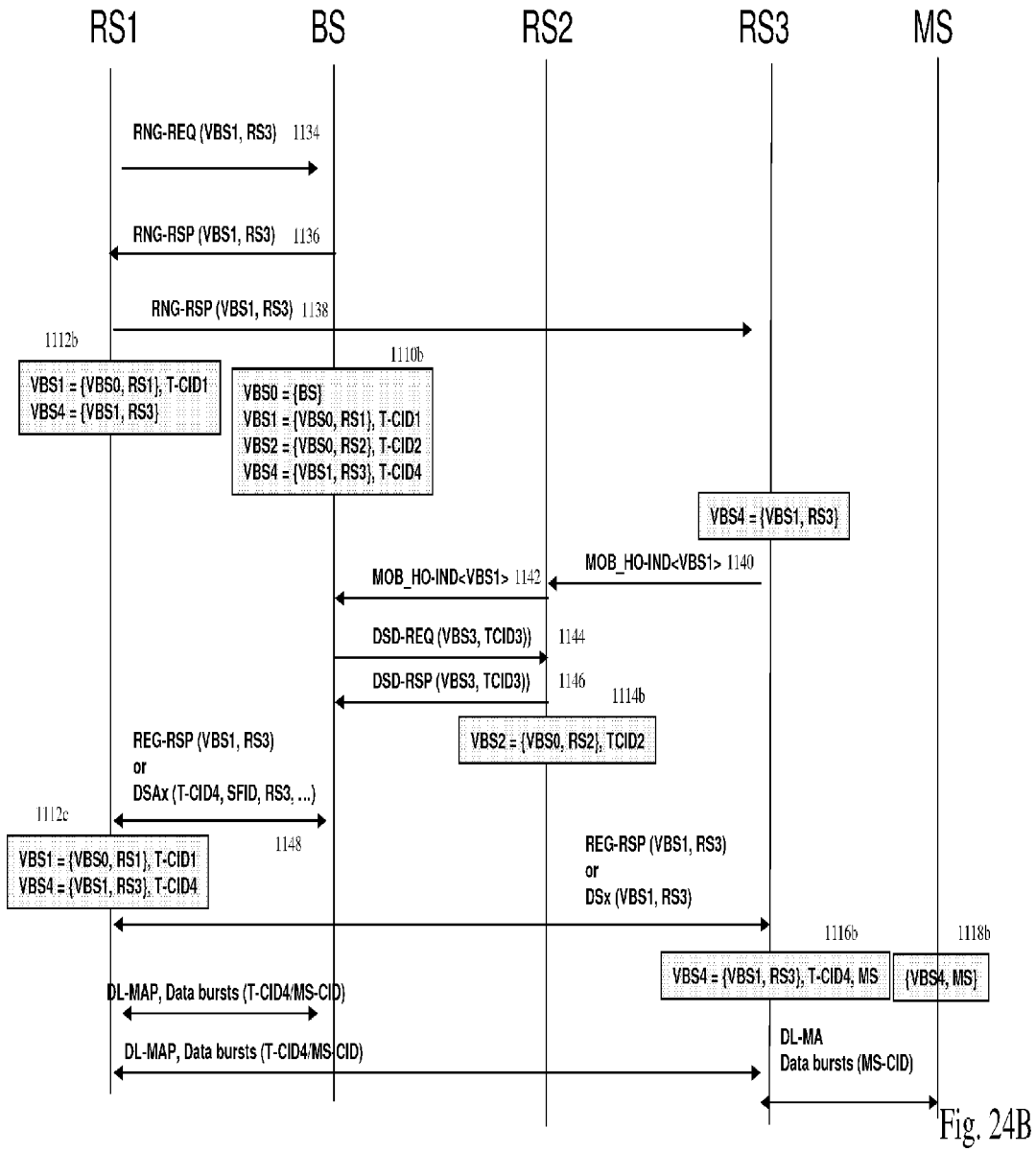
FIG. 24B is a continuation of the working flow diagram of FIG. 24A.

In FIG. 23 there is shown an RS (RS3) that moves intra-tree. The MS remains attached to RS3 during this process, and is unaware of the handover. Prior to handover, the MMR topology is shown on the left. A BS 1100 is coupled via one branch to an RS 1 (1102), and via another branch to an RS2 (1104) and RS3 (1106). The MS 1108 is attached to the RS3 1106. After handover, the MS 1108 is attached to the RS1 1102. The working flow for this process is shown in FIGS. 24A and 24B. Prior to handover, there are four VBS's: VBS0 (BS), VBS1 (VBS0, RS1), VBS2 (VBS0, RS2), and VBS3 (VBS2, RS3). The VBS routing table for the BS includes path entries for all four VBS and their associated T-CID (T-CID 1-3 respectively). RS1's VBS routing table 1112a includes the path entry for VBS1, and associated T-CID 1. The VBS routing table 1114a for RS2 includes the path list for VBS2 and its associated T-CID2, and the path list for VBS3 and its associated T-CID3. The VBS routing table 1114a for RS3 includes the path list for VBS3, the associated T-CID3, and the associated endpoint MS. The MS is shown currently attached to RS3 (1116a). DL-MAP and data bursts are relayed between the BS and MS via VBS3 and T-CID3 (1120, 1122, 1124).

RS3 knows from its own VBS path list that its father is VBS2 (VBS0, RS2), which is its serving VBS. The BS broadcasts the MOB_NBR-ADV message, advertising other available VBSs including VBS0, VBS1, and VBS2 (1126). RS3 starts its scan process with the recommended VBS list in this advertisement message. Meanwhile, RS3 has received the DL-MAP from RS1, which includes the VBS ID VBS1 (VBS0, RS1) (1128). RS3 uses this VBSID for initial ranging. MOB_HO-REQ and MOB_HO-RSP messages are exchanged between RS3 and BS (1130). RNG-REQ and RNG-RSP messages are exchanged between RS3 and VBS1 (1132, 1134, 1136, 1138). The ranging process between RS3 and RS1 results in updates to the VBS routing tables. A new VBS VBS4 is created (via the same mechanisms as previously described) with path list (VBS1, RS3), and a new tunnel CID T-CID4. The BS routing table 1110b and the RS1 routing table 1112b are updated with this new VBS4. RS3 then sends MOB_HO-IND to the BS indicating that it is severing itself from the serving VBS1 (1140, 1142). Then DSD-REQ and DSD-RSP messages are exchanged between BS and RS2 (1144, 1146) in order to remove the VBS3 and T-CID3 from the RS2 routing table (1114b), effectively eliminating VBS3. The BS then sends either a REG-RSP message to RS1 and RS3 to force a T-CID update, or it exchanges DSAx messages resulting in a new T-CID4 assigned to VBS4 (1148). The RS1 routing table 1112c and RS3 routing table 1116b are updated with the T-CID4. The BS now re-directs data flow to the MS (now attached to VBS4 (1118b)) via the new VBS4 by putting the new VBS4 T-CID4 in its DL-MAP and data bursts. Data is thus relayed from BS to RS1 to RS3 via T-CID4. At RS3, the bursts are decapsulated and sent to the MS via it's CID, which has not changed.

In FIG. 25, there is shown an RS that moves intra-tree. Two MMR trees are shown. In their initial topologies as shown at the top of FIG. 21, BS1 (1200) is the root of one tree, and RS1 (1202) is subordinate to it. BS2 (1204) is the root of another tree, and RS2 (1206) is subordinate to it. An MS 1208 is initially attached to the RS1. There are four VBS—VBS0 (BS2), VBS1 (VBS0, RS2), VBS2 (BS1), and VBS3 (VBS2, RS1). At the bottom of FIG. 21, the MMR topologies are shown after RS1 moves to attach to VBS0. Now BS1 has no children, while BS2 has two branches. A new VBS4 includes BS2 and RS1, while VBS3 has been eliminated. The MS 1208 remains attached to RS 1.

Figure 26A:
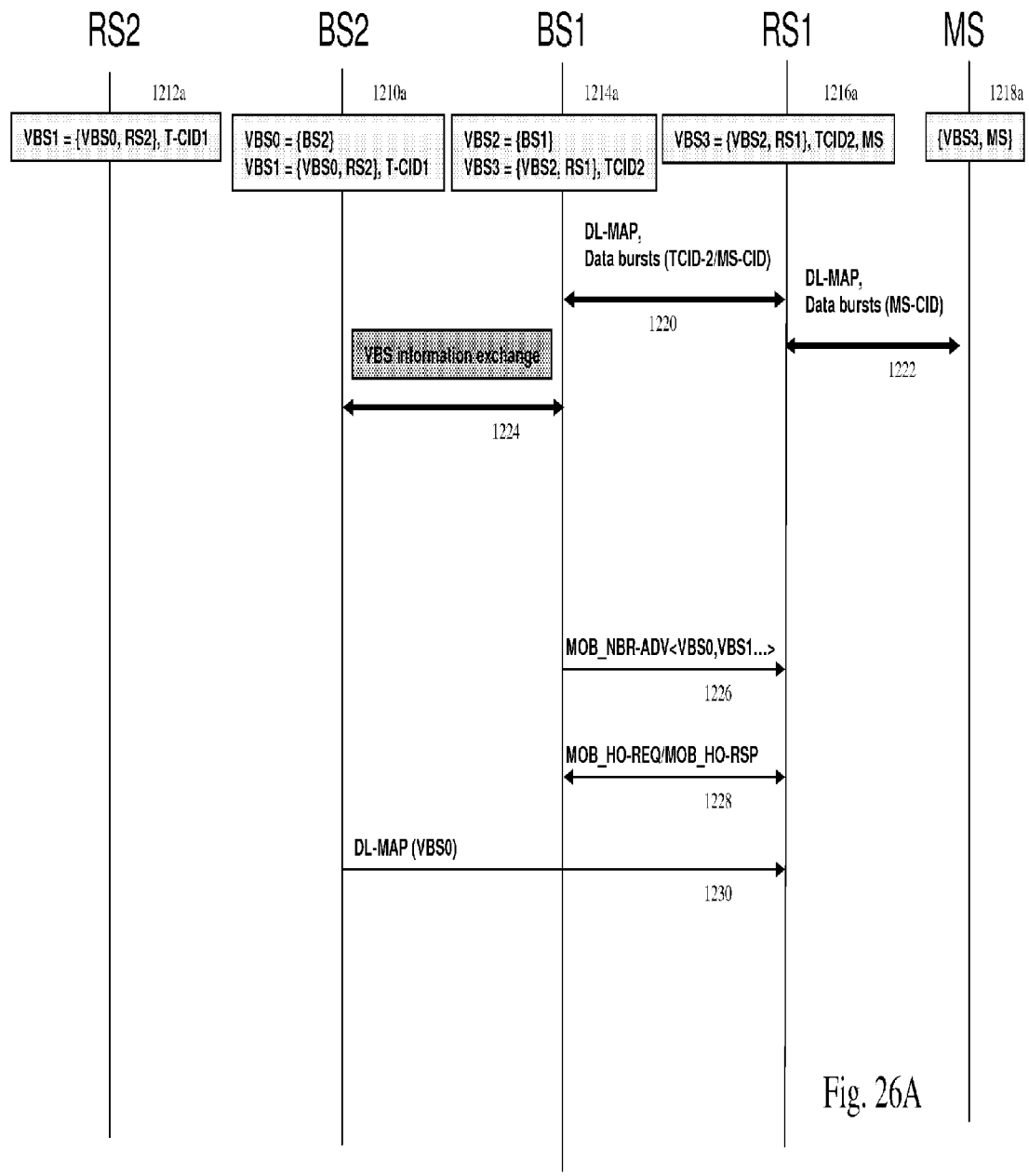
FIG. 26A is a working flow diagram of the message exchanges supporting the RS mobility of FIG. 21.
Figure 26B:
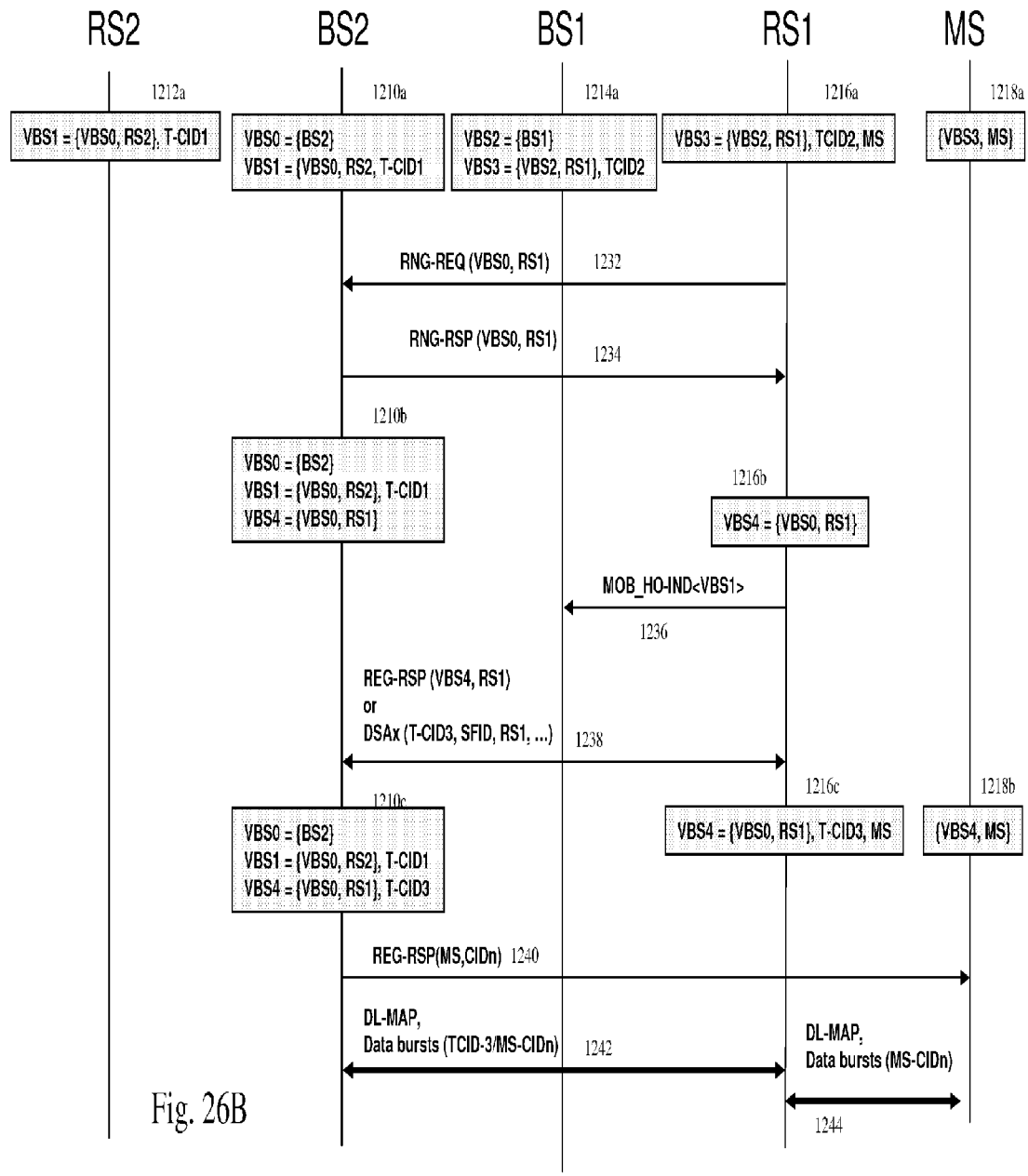
FIG. 26B is a continuation of the working flow diagram of FIG. 26A.

The work flow diagram for this handover is shown in FIGS. 26A-26B. Initially, the BS2 VBS routing table 1210a has entries for VBS0 and VBS1. The VBS1 entry has associated with it T-CID1. The RS2 VBS routing table 1212a has an entry for VBS1 and T-CID1. The BS1 VBS routing table 1214a has entries for VBS2, and VBS3 and its T-CID2. The RS1 VBS routing table 1216a has an entry for VBS3, its T-CID2, and endpoint MS. The MS is attached to VBS3 (as indicated by 1218a), and DL-MAP and data bursts are exchanged between BS1 and MS via T-CID2 (1220, 1222).

BS1 and BS2 exchange their VBS routing tables so that each BS can advertise VBS's for the other's subordinate trees as well as its own (1224). This exchange may involve ASN anchor point involvement. BS1 sends its MOB_NBR-ADV message, which is received by RS1 (1226). The advertisement message includes BS1's recommended VBS list, including BS2's VBS0 and VBS1. MOB_HO-REQ and M)B_HO-RSP messages are exchanged between BS1 and MS (1228). The RS1 has also received the DL-MAP from VBS0 (1230). RS1 performs initial ranging with VBS0 by exchanging RNG-REQ and RNG RSP messages with VBS0 (1232, 1234). This results in updates to the BS2 and RS1 tables adding VBS4 with path (VBS0, RS1). After RS1 sends MOB_HO-IND to the severing BS1 (1236), REG-RESP or DSAx messages are exchanged between BS2 and RS1 (1238) resulting in the addition of tunnel CID T-CID3 to the VBS4 entries in the respective tables (1210c, 1216c). A further REG-RSP is sent from the BS2 to the MS in order to update the MS's CID (herein shown updated to CIDn) to ensure no CID conflict between the separate MMR trees (1240). Now MS is attached to VBS4 (1218b), and DL-MAP and data bursts are exchanged between the new BS2 and the MS via RS1 over T-CID3. Numerous modifications and variations of the present invention are possible in light of the above teachings. It is therefore to be understood that within the scope of the appended claims, the invention may be practised otherwise than as specifically described herein.

We claim:

1. Apparatus for use in a wireless multi-hop relay network arranged in a tree topology, the apparatus comprising:
   a first virtual access point (VAP) having a tree topology, wherein a tree head of the tree topology includes a base station, the tree topology of the first VAP including one or more VAP relay stations coupled to the base station via subordinate tree branches;
   a second VAP having a tree topology, wherein a tree head of the tree topology includes a relay station, the tree topology of the second VAP including one or more VAP relay station coupled to the relay stations via subordinate tree branches;
   the first and second VAPs associated as a first virtual base station (VBS), the first and second VAPs each having a unique virtual base station identifier (VBS-ID) associated with a path defined by the base station and one or more VAP relay stations in at least one of the first and second VAPs in the first VBS;
   a VAP relay station in the second VAP having logic for using the VBS-ID of the second VAP for communicating with a subscriber station attached to the second VAP such that communications between the base station and the subscriber station occur via the first VBS, wherein a relay station in the first VBS comprises logic to perform the following functions:
receive a DL-MAP message from the base station;
a. if the relay station is not attached to an upstream station then:
send a range request message to the upstream station;
receive a range response message from the upstream station containing a unique VBS-ID for the relay station;
exchange DSx messages with the upstream station to obtain a tunnel connection identifier (T-CID); and
update a routing table associated with the relay station with an entry including the VBS-ID and the T-CID;
b. if the relay station is attached to an upstream station:
replace a station identifier in the DL-MAP message with the VBS-ID for the relay station; and
forward the DL-MAP message downstream.

2. The apparatus of claim 1, wherein the logic further perform the functions:
receive a range request message from a downstream relay station;
receive a range response message from an upstream station containing a unique VBS-ID for the downstream relay station;
receive a DSx message from the upstream station containing a T-CID for the downstream relay station;
forward the Dsx message to the downstream relay station;
updating, by the relay station, the routing table with the VBS-ID and T-CID for the downstream relay station.

3. The apparatus of claim 1, wherein the base station and all VAP relay stations in the first VAP share a same radio resource, and wherein the first VAP provides multiple radio links via the VAP relay stations; the relay station in the second VAP capable of communicating with the first VAP over any one of the radio links in a manner transparent to the relay station.

4. The apparatus of claim 3, wherein the base station selects the radio link for communication with the relay station based on link signal quality.

5. The apparatus of claim 3, wherein the relay station and all VAP relay stations in the second VAP share the same radio resource, and wherein the second VAP provides multiple second radio links via the VAP relay stations in the second VAP; the subscriber station capable of communicating with the second VAP over any one of the second radio links in a manner transparent to the subscriber station.

6. The apparatus of claim 5, wherein the relay station selects the radio link for communication with the subscriber station based on link signal quality.

7. The apparatus of claim 1, wherein the first VBS is associated with the T-CID, and wherein the base station in the tree topology of the first VAP uses the T-CID to relay subscriber station data communications between the base station and the relay station in the second VAP.

8. The apparatus of claim 7, wherein the base station in the first VAP and the relay station in the second VAP each comprise a routing table, each routing table including one or more entries comprising: a VBS-ID, a path list associated with the VBS-ID, a T-CID associated with the virtual base station, an inter-VAP next hop, an intra-VAP next hop, an ingress port, an egress port, and an endpoint identifier.

9. A method for use in a wireless multi-hop relay network arranged in a tree topology, the method comprising the steps of:
providing a first virtual access point (VAP) having a tree topology, wherein a tree head of the tree topology includes a base station, the tree topology of the first VAP including one or more VAP relay stations coupled to the base station via subordinate tree branches;
providing a second VAP having a tree topology, wherein a tree head of the tree topology includes a relay station and one or more VAP relay stations coupled to the relay station via subordinate tree branches;
associating the first and second VAPs as a first virtual base station (VBS), the first and second VAPs each having a unique virtual base station identifier (VBS-ID) associated with a path defined by the base station and one or more VAP relay stations in at least one of the first and second VAPs in the first VBS;
a VAP relay station in the second VAP using the VBS-ID of the second VAP for communicating with a subscriber station attached to the second VAP such that communications between the base station and the subscriber station occur via the first VBS;
receiving, by the relay station, a DL-MAP message from the base station;
a. if the relay station is not attached to an upstream station then:
sending a range request message to the upstream station;
receiving a range response message from the upstream station containing a unique VBS-ID for the relay station;
exchanging DSx messages with the upstream station to obtain a T-CID;
updating, by the relay station, a routing table with an entry including the VBS-ID and tunnel CID;
b. if the relay station is attached to an upstream station:
replacing a station identifier in the DL-MAP message with the VBS-ID for the relay station; and
using, by a last relay station in a branch, the VBS-ID associated with the last relay station to communicate with an attached subscriber station such that communications between the base station and the subscriber station occur via the first VBS.

10. The method of claim 9, further comprising:
receiving, by the relay station, a range request message from a downstream relay station;
receiving, by the relay station, a range response message from an upstream station containing a unique VBS-ID for the downstream relay station;
receiving, by the relay station, a DSx message from the upstream station containing a T-CID for the downstream relay station;
forwarding, by the relay station, the Dsx message to the downstream relay station; and
updating, by the relay station, the routing table with the VBS-ID and T-CID for the downstream relay station.

* * * * *

UNITED STATES PATENT AND TRADEMARK OFFICE
CERTIFICATE OF CORRECTION

| | | |
|---|---|---|
| PATENT NO. | : 9,026,039 B2 | Page 1 of 1 |
| APPLICATION NO. | : 13/757416 | |
| DATED | : May 5, 2015 | |
| INVENTOR(S) | : Guo Qiang Wang et al. | |

It is certified that error appears in the above-identified patent and that said Letters Patent is hereby corrected as shown below:

On the Title Page:

Item (71) Please delete "Apple, Inc." and substitute -- Apple Inc. --

In the Claims:

Claim 1, Column 16, Line 55, please delete "station coupled to the relay stations" and substitute -- stations coupled to the relay station --

Signed and Sealed this
Twenty-seventh Day of October, 2015

Michelle K. Lee
*Director of the United States Patent and Trademark Office*